US012734466B2

(12) United States Patent
Cnossen

(10) Patent No.: US 12,734,466 B2
(45) Date of Patent: Sep. 15, 2026

(54) REMOVAL DEVICE

(71) Applicant: Flamco B.V., Bunschoten (NL)

(72) Inventor: Jan Henk Cnossen, Koudum (NL)

(73) Assignee: Aalberts hfc B.V., Almere (NL)

( * ) Notice: Subject to any disclaimer, the term of this patent is extended or adjusted under 35 U.S.C. 154(b) by 427 days.

(21) Appl. No.: 17/022,195

(22) Filed: Sep. 16, 2020

(65) Prior Publication Data

US 2021/0077922 A1 Mar. 18, 2021

Related U.S. Application Data

(60) Continuation of application No. 15/854,868, filed on Dec. 27, 2017, now Pat. No. 10,786,762, which is a (Continued)

(30) Foreign Application Priority Data

Jan. 11, 2012 (NL) ..................................... 2008106
Mar. 13, 2012 (NL) ..................................... 2008479
Oct. 8, 2012 (NL) ..................................... 2009588

(51) Int. Cl.
*B01D 21/00* (2006.01)
*B01D 17/02* (2006.01)

(Continued)

(52) U.S. Cl.
CPC ..... *B01D 21/0042* (2013.01); *B01D 17/0214* (2013.01); *B01D 19/0042* (2013.01);

(Continued)

(58) Field of Classification Search
CPC ....................... B01D 21/0042; B01D 21/0045; B01D 21/02; B01D 21/24; B01D 21/2483;

(Continued)

(56) References Cited

U.S. PATENT DOCUMENTS 4,390,417 A 6/1983 Sweeney
4,614,527 A 9/1986 Reimann (Continued)

FOREIGN PATENT DOCUMENTS

DE 10003464 A1 8/2001
EP 1820550 A1 8/2007

(Continued)

OTHER PUBLICATIONS

English Machine Translation of DE 100 03 464.

(Continued)

*Primary Examiner* — T. Bennett McKenzie

(74) *Attorney, Agent, or Firm* — Hoffmann & Baron, LLP

(57) ABSTRACT

A removal device for removing gas bubbles and/or dirt particles from a liquid in a liquid conduit system or for removing a second liquid from a first liquid in the conduit system includes a main channel for a main flow, a housing which defines an inner space, at least one supply channel extending from the main channel to the inner space, at least one return channel extending from the inner space back to the main channel, directly or indirectly via a return chamber, at least one quiet zone in the inner space in which in use the liquid has a substantially smaller velocity than in the main channel. The quiet zone is configured to allow dirt particles or a relatively heavy liquid to settle at a lower end of the housing and/or gas bubbles or a relatively light liquid to rise to an upper end of the housing.

21 Claims, 22 Drawing Sheets

Related U.S. Application Data division of application No. 14/371,578, filed as application No. PCT/NL2013/050015 on Jan. 11, 2013, now Pat. No. 9,884,270.

(60) Provisional application No. 61/585,331, filed on Jan. 11, 2012.

(51) Int. Cl.
*B01D 19/00* (2006.01)
*B01D 21/02* (2006.01)
*B01D 21/24* (2006.01)

(52) U.S. Cl.
CPC ......... *B01D 21/0045* (2013.01); *B01D 21/02* (2013.01); *B01D 21/24* (2013.01); *B01D 21/2483* (2013.01); *B01D 21/2494* (2013.01); *B01D 2221/02* (2013.01)

(58) Field of Classification Search
CPC ............ B01D 21/2494; B01D 17/0214; B01D 19/0042; B01D 2221/02
USPC ............................................................ 95/253
See application file for complete search history.

(56) References Cited

U.S. PATENT DOCUMENTS 4,746,335 A * 5/1988 Reimann ............ B01D 19/0042 96/165
5,036,697 A 8/1991 Fujiwara et al.
6,752,860 B1 6/2004 Hoydal et al.
6,991,114 B2 * 1/2006 Allen, II ............ B01D 21/2411 210/519
8,123,935 B2 * 2/2012 Murray .................. B01D 29/66 210/170.03
2001/0013489 A1 8/2001 Williamson
2005/0167344 A1 8/2005 Phillips
2005/0184007 A1 8/2005 Allard et al.
2008/0110344 A1 * 5/2008 Follette .............. B01D 19/0042 96/210
2009/0234320 A1 9/2009 Watson
2010/0236409 A1 * 9/2010 Cnossen ............ B01D 21/2494 95/266
2012/0175318 A1 7/2012 Zaanen et al.

FOREIGN PATENT DOCUMENTS

EP 2266676 A1 12/2010
GB 260523 A 11/1926
JP 2929668 B2 8/1999
NL 2006887 C 12/2012
NL 2006902 C 12/2012
WO 91/02948 A1 3/1991
WO 2011/037465 A1 3/2011
WO 2012/165965 A2 12/2012

OTHER PUBLICATIONS

International Preliminary Report on Patentability dated Apr. 29, 2014 for PCT/NL2013/050015.
International Search Report dated Apr. 8, 2013 for PCT/NL2013/050015.
Netherlands Search Report dated Jan. 11, 2012 for a counterpart foreign application.
Netherlands Search Report dated Oct. 1, 2012 for a counterpart foreign application.
Netherlands Search Report dated Apr. 9, 2013 for a counterpart foreign application.
Extended European Search Report, application No. 16188001.8, dated October 124, 2016.
EPO Office Action for EPC Application No. 16188001.8-1371, dated Oct. 5, 2017 (8 pages).

* cited by examiner

REMOVAL DEVICE

CROSS-REFERENCE TO RELATED APPLICATIONS

This application is a Continuation of U.S. patent application Ser. No. 15/854,868, filed Dec. 27, 2017, which is Divisional of U.S. patent application Ser. No. 14/371,578, filed Jul. 10, 2014, now U.S. Pat. No. 9,884,270, granted Feb. 6, 2018, which is the National Stage of International Application No. PCT/NL2013/050015 filed Jan. 11, 2013, which claims the benefit of Netherlands Application No. 2008106, filed Jan. 11, 2012; U.S. Provisional Application No. 61/585,331, filed Jan. 11, 2012; Netherlands Application No. 2008479, filed Mar. 13, 2012; and of Netherlands Application No. 2009588, filed Oct. 8, 2012, the contents of all of which are incorporated by reference herein.

FIELD OF THE INVENTION

The present invention relates to a removal device for removing dirt particles and gas bubbles from a liquid in a liquid conduit system. The present invention may also be used to separate two liquids, i.e. to remove a second liquid having a greater density or a smaller density from a first liquid.

BACKGROUND OF THE INVENTION

Many conduit systems in which a liquid is conveyed have issues of contaminations in the liquid. This is in particular the case with closed circuits, wherein a liquid may be circulated for a long time period. Such systems are for instance used for heating purposes. Over time, gas bubbles or dirt particles may contaminate the liquid and may deteriorate the functioning of the closed circuit, for instance because the system becomes clogged, or because valves do not function very well. It is also possible that gas bubbles assemble in certain parts of the closed circuit, leading to dead branches, i.e. to parts of the closed circuit where the flow is obstructed. Also noise problems may occur due to gas bubbles in the conduit system.

Over time, different devices have been developed for removing gas bubbles and/or dirt particles and for removing contaminating liquids from a main liquid.

One of these devices has been developed by the present applicant and is published under number WO2011037465.

SUMMARY OF THE INVENTION

During research, it was found that a number of improvements to the known system are possible, which improvements lead to a higher degree of removal of gas bubbles and/or dirt particles from the liquid.

In an embodiment, the invention provides a removal device for removing gas bubbles and/or dirt particles from a liquid in a liquid conduit system or for removing a second liquid from a first liquid in the conduit system, the removal device comprising:

a main channel for a main flow, the main channel having an entry and an exit which are configured to be connected to the conduit system, a housing which defines an inner space, at least one supply channel extending from the main channel to the inner space, at least one return channel extending from the inner space back to the main channel, directly or indirectly via a return chamber, a quiet zone in the inner space in which in use the liquid has a substantially smaller velocity than in the main channel, the quiet zone being configured to allow dirt particles or a relatively heavy liquid to settle at a lower end of the housing and/or gas bubbles or a relatively light liquid to rise to an upper end of the housing.

In an embodiment, the at least one supply channel branches off from the main channel at a branch-off location, wherein at the branch-off location a local widening part is provided in the main channel which extends substantially around the main channel, the local widening part being constructed to guide an outer part of the main flow which flows through the main channel into the local widening part and subsequently into the at least one supply channel.

In an embodiment, directly downstream of the local widening part a local narrowing part of the main channel is provided. The local narrowing part may comprise a sharp edge which is directed against the direction of the main flow. The narrowing part is constructed to guide an outer portion of the main flow into the local widening part. The sharp edge may extend circumferentially around the main channel, preferably over at least 180 degrees, more preferably at least over about 270 degrees of the circumference of the main flow channel. In this way, the outer portion of the main flow is branched off. The local widening part may leave a circumferential gap at which no branching of fluid from the main flow occurs of less than 90 degrees.

In an embodiment, a wall which defines the local widening part gradually goes over in a wall of the at least one supply channel.

In an embodiment, the removal device comprises two supply channels.

In an embodiment, the branch off location is configured to branch off a C-shaped outer portion from the main flow. This may be achieved by a local widening part which has a substantial C-shape which extends around the main channel, and wherein the respective entries of the respective supply channels are provided at the respective ends of the substantial C-shape. Other configurations are also possible, such as a C-shaped sharp ridge without a widening part.

In an embodiment, the at least one supply channel and the return channel are configured to branch off a supply flow having a discharge which is between 1 and 15 percent of the discharge of the main flow, more in particular between 1 and 8 percent. A skilled person will understand that the percentage is determined by the cross sections of the supply channel and the return channel(s). Generally, the narrowest part of the supply channel(s) and/or return channel (s) determines the percentage. However, the exact shape of the widening part and the sharp ridge also play a role. It may be that the widening part and the sharp ridge may be constructed to branch off a relatively large portion (percentage) of the main flow, but that a narrow cross-section of the return channel limits this portion, thereby maintaining the flow velocity in the quiet zone to a minimum.

The cross-sectional area of a part of the return channel may be so small that the average velocity of flow in the quiet zone is smaller than 3 cm/s, while the average velocity of the main flow in the main channel can vary from 0.5 m/s up to 3 m/s.

The present invention may relate to a single housing defining a single quiet zone.

In an embodiment, the housing is arranged adjacent the main flow channel.

In an embodiment, the at least one return channel merges with the main channel at a merge location which is located upstream of a branch-off location where the at least one supply channel branches off from the main channel.

The at least one return channel may merge with the main channel at a return opening, wherein the return opening, when viewed in the direction of the main flow, is located substantially between the two ends of the C-shape of the widening part.

In an embodiment, the at least one return channel merges with the main channel at a return opening, wherein the return channel is oriented substantially orthogonally to the main channel at the return opening, such that in use the return flow is guided substantially into a center of the main flow, pushing the main flow outwards to an outer region of the main channel and into the local widening part.

In an embodiment, the at least one supply channel gradually widens into the quiet zone.

In an embodiment, the quiet zone comprises energy absorption elements in the form of plates which are spaced apart from one another and form interspaces between the plates, wherein the supply channel is directed toward the interspaces, such that in use a supply flow which enters the quiet zone via the supply channel flows through the interspaces between the plates, or wherein the quiet zone comprises a single energy absorption element in the form of a protrusion extending inward from a wall of the housing. The single energy absorption element may have a broad part at the end of the protrusion.

In an embodiment, the supply channel enters the quiet zone in a substantially horizontal direction, and the interspaces have a dead end and an open bottom and/or an open upper end, such that in use the supply flow is first directed substantially horizontally into the interspaces and subsequently curves downward and/or upward, through the open bottoms and/or upper ends of the interspaces into the quiet zone. In an embodiment, the quiet zone comprises an upper volume and a lower volume, separated from one another by a separating member having a central opening which connects the upper volume with the lower volume.

In the described embodiment above, the quiet zone is connected to the main channel via a coupling.

When the housing which defines the quiet zone is integral with the main channel and surrounds the main channel, the local widening part has a substantial O-shape, which entirely surrounds the main channel.

In an embodiment, the inner volume of the quiet zone is elongate and extends substantially vertically.

In an embodiment, an exit of the supply channel into the inner space and an entry of the return channel from the inner space are provided in an upper region of the quiet zone.

In an embodiment, the housing is pivotably connected to the main channel via a pivotable coupling and is pivotable about a pivot axis which extends substantially transverse to the direction of the main channel.

In an embodiment, the housing is pivotable relative to the main channel to at least the following orientations:

- a first orientation in which the direction of settling is substantially parallel to the direction of the main channel, and
- a second orientation in which the direction of settling is substantially orthogonal to the direction of the main channel.

In an embodiment, the pivot axis is coaxial with at least a part of the supply channel.

The plurality of energy absorbing elements or the single energy absorbing element may have a leading edge which is thicker than a trailing part of the energy absorbing element.

The leading edge may go over in the thinner trailing part via an abrupt transition, which in use creates a local underpressure in the liquid which flows past the transition, which in turn causes gas bubbles to form.

The single energy absorption element may have a substantially T-shape, when viewed from above.

In an embodiment, the removal device comprises a return chamber which is provided between the quiet zone and the return channel, the return chamber comprising at least one entrance via which the return flow enters the return chamber from the quiet zone, the return chamber comprising a plurality of exits arranged equidistant from the pivot axis, the return chamber being pivotable about the main channel together with the housing, wherein one or more return channels extend between the return chamber and the main channel, the one or more return channels being fixed relative to the main channel, wherein the plurality of exits are arranged to alternately be positioned at the one or more return channels, in dependence of a pivot angle of the housing about the pivot axis.

In an embodiment, a plurality of energy absorbing elements have a leading edge which is thicker than a trailing part of the energy absorbing element.

In an embodiment, wherein the leading edge goes over in the thinner trailing part via an abrupt transition, which in use creates a local underpressure in the liquid which flows past the transition, which in turn causes gas bubbles to form.

In an embodiment, the removal device comprises a rail which is attached to the outside of the housing and which extends in a settling direction, wherein a magnet is attached to the rail, the magnet being slidably arranged and configured to be moved from a first position near the energy absorbing elements to a second position near the quiet zone.

In an embodiment, the rail is pivotable together with the housing relative to the main channel.

In an embodiment, the magnet is provided with a logo or a brand name of the manufacturer of the removal device.

The removal device may comprise a flow guide, in particular formed by a part of the supply channel and/or a wall of the housing, which curves the branch flow entering the quiet zone into a direction substantially opposite to the direction of the main flow.

The return channel may be configured to inject the return flow into a central region of the main flow channel. This prevents that the return flow is branched off again at the branch off location. It is noted that an embodiment having a return opening which is located substantially between the two ends of the C-shape of the widening part, has the specific advantage that injection of the return flow into the main channel does not require that the return flow is injected into the central region of the main flow in order to prevent the return flow from being branched off again. Even if the return flow is injected into the main flow but stays substantially along the outer rim of the main flow channel, the return flow is not branched off again, because it flows between the two ends of the C-shape, where no branching off takes place.

In the removal device, a distance between the branch flow entry and the return flow exit measured along the main flow channel may be less than three times the diameter D of the main flow channel, in particular less than twice the diameter D of the flow channel. The return flow channel may protrude into the main channel over a distance d which is at least 10 percent of a diameter of the main channel, in particular at least 15 percent of a diameter of the main channel. The distance d helps in injecting the return flow into a central portion of the main channel, but a protruding return flow channel may also block the main channel to some extent. For this reason the distance d will preferably be less than 0.75*r. The return flow channel may extend at an angle of between 10 and 80 degrees with the main flow channel.

An angle $\alpha$ at which the return flow enters the main flow channel may be greater than 45-90*d/r and smaller than 135-90*d/r, wherein d is a distance over which the return flow channel protrudes into the main flow channel and r is a radius of the main flow channel.

The present invention further relates to a method of removing dirt particles or gas bubbles from a liquid, the method comprising:

providing a removal device according to the present invention, guiding a flow of liquid through the removal device.

The present invention further relates to a removal device for removing gas bubbles and/or dirt particles from a liquid in a liquid conduit system or for removing particles of a heavier or lighter liquid from the liquid in the liquid conduit system, the removal device comprising:

an entry, at least one exit, a housing which defines an inner space, a main flow channel extending from the entry to the exit at least in part through the inner space, the main flow channel being defined by at least one tube, at least one branch flow passage, the branch flow passage allowing fluid communication between the main flow channel and quiet zone outside the tube and within the inner space defined by the housing, at least one return flow passage the return flow passage allowing fluid communication between the quiet zone outside the tube and the main flow channel, wherein the quiet zone has a greater cross-sectional area than the main channel and wherein the removal device is constructed to branch off only a relatively small portion of the main flow, wherein in use the liquid in the at least one quiet zone has a substantially smaller velocity than the liquid in the main flow channel, allowing dirt or particles of a heavier liquid to settle and/or allowing gas bubbles or particles of a lighter liquid to rise in the quiet zone.

In an embodiment, a plate is provided at a downstream end of the inner space, upstream of the return flow passages, when viewed along the direction of flow in the inner space.

In an embodiment, the branch flow passage provides direct access from the main flow channel to the quiet zone, i.e. without any intermediate chamber.

In an embodiment, the main flow channel is defined by two coaxial tubes.

The plate may be provided at an upstream end of the inner space and downstream of the at least one return flow passage, when viewed along the direction of flow in the main channel.

In an embodiment, the plate extends from the tube vertically in an upward direction until it reaches a housing wall of the housing.

In an embodiment, at least one opening is provided by the plate at a position adjacent to or near the housing wall, which opening is dimensioned to facilitate the passage of air.

In an embodiment, the return flow passage is located at an upstream side of the housing, and upstream of the plate, when viewed along the direction of flow in the main channel.

In an embodiment, the plate and the return flow passage are constructed to in use force the liquid to flow along the under part of the plate to reach the return flow passage. The branch flow flows underneath the lower edge of the plate to reach the return flow passage.

In an embodiment, the return flow passage is formed by a tube extending from an area surrounded by the tube, the plate and the housing wall into the main flow channel.

In an embodiment, the tube—when viewed in the direction of the main channel—extends transverse to the main flow channel and—when viewed in side view—the tube extends in a downstream direction.

The return flow passage may be configured to inject the return flow into a central region of the main flow channel. In an embodiment, the branch-off location is formed to branch off an outer annular portion of the main flow in the main flow channel and the return flow passage is configured to inject the return flow into a central region of the main flow channel. This has the advantage that the return flow is substantially not branched off again at the branch off location, while at the same time a complete or substantially complete outer layer (or outer annulus) of the main flow is branched off.

The main flow channel will generally be substantially free of any obstructions, apart from the end of the return flow channel which may form a protrusion into the main channel.

When seen in side view—an angle $\alpha$ at which the return flow passage extends relative to the main channel may be greater than 45-90*d/r and smaller than 135-90*d/r, wherein d is a distance over which the return flow passage protrudes into the main flow channel and r is a radius of the main flow channel.

A distance between the branch flow entry and the return flow exit measured along the main flow channel may be less than three times the diameter (D) of the main flow channel, in particular less than twice the diameter (D) of the flow channel.

BRIEF DESCRIPTION OF THE DRAWINGS

The previous and other features and advantages of the present invention will be more fully understood from the following detailed description of exemplary embodiments with reference to the attached drawings. Like reference numerals refer to like parts.

DETAILED DESCRIPTION OF THE INVENTION

Figure 1:
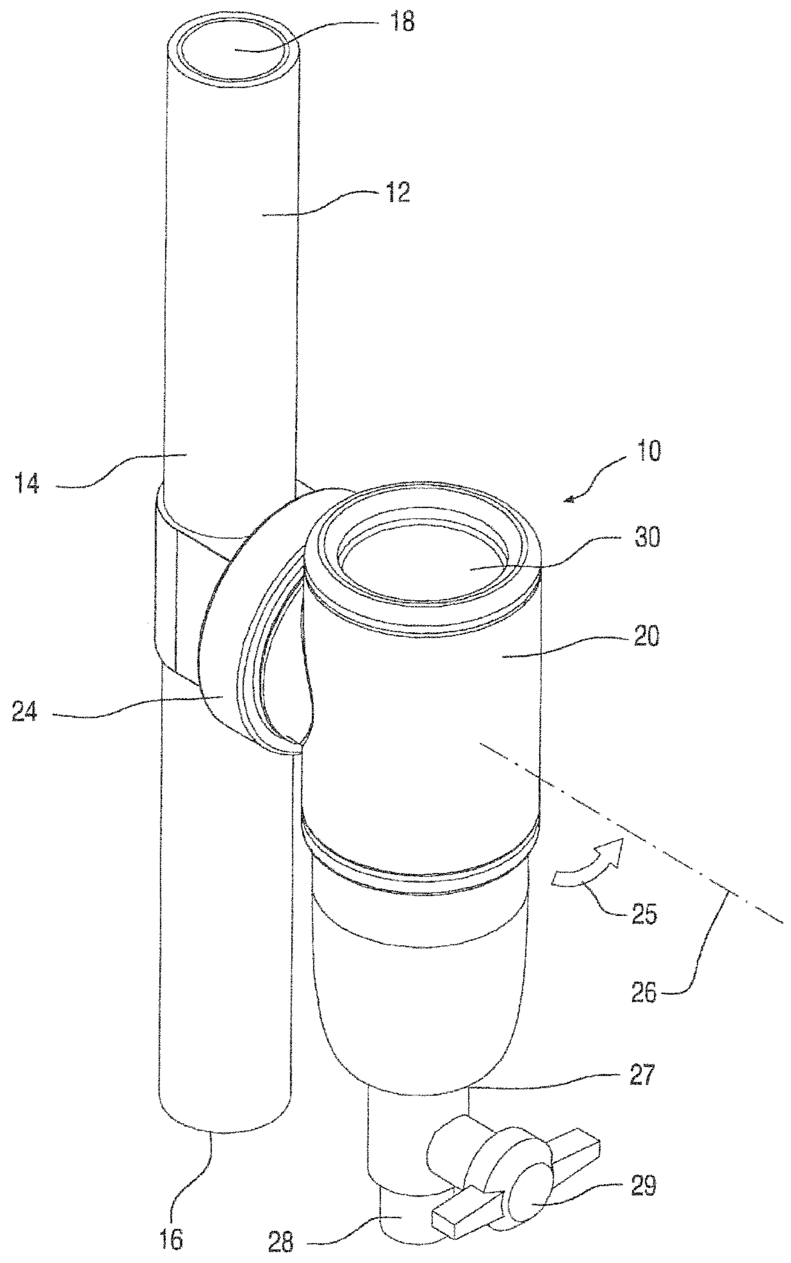
FIG. 1 shows an isometric view of the removal device according to the invention.

Turning to FIGS. 1, 2A, 2B, 3, 4, the device 10 according to the invention is shown. A pipe 12 defines a main channel 14. The main channel 14 has an entry 16 and an exit 18. The entry and exit may comprise thread for coupling to a conduit system, such as a heating system.

The device 10 comprises a housing 20 which defines an inner space 22. A quiet zone 23 is defined in the inner space 22. The housing is coupled to the main channel via a coupling 24 which allows pivoting of the housing 20 relative to the main channel 14 about a pivot axis 26, i.e. in the direction of arrow 25. In this way, the housing 20 can extend parallel to the main channel 14 or perpendicular to the main channel 14.

In top view, the housing 20 has a substantially circular form. The housing is elongate in the vertical direction, i.e. the housing has a height which is greater than the diameter 33 of the housing.

At a bottom end 27 of the housing, a dirt discharge 28 with an opening and closing mechanism 29 is provided for discharging dirt particles. At an upper end 30, a gas discharge may be provided for discharging gas. The dirt discharge 28 may also be used for removing a second, heavier liquid from a first, main liquid in the conduit system.

Figure 2A:
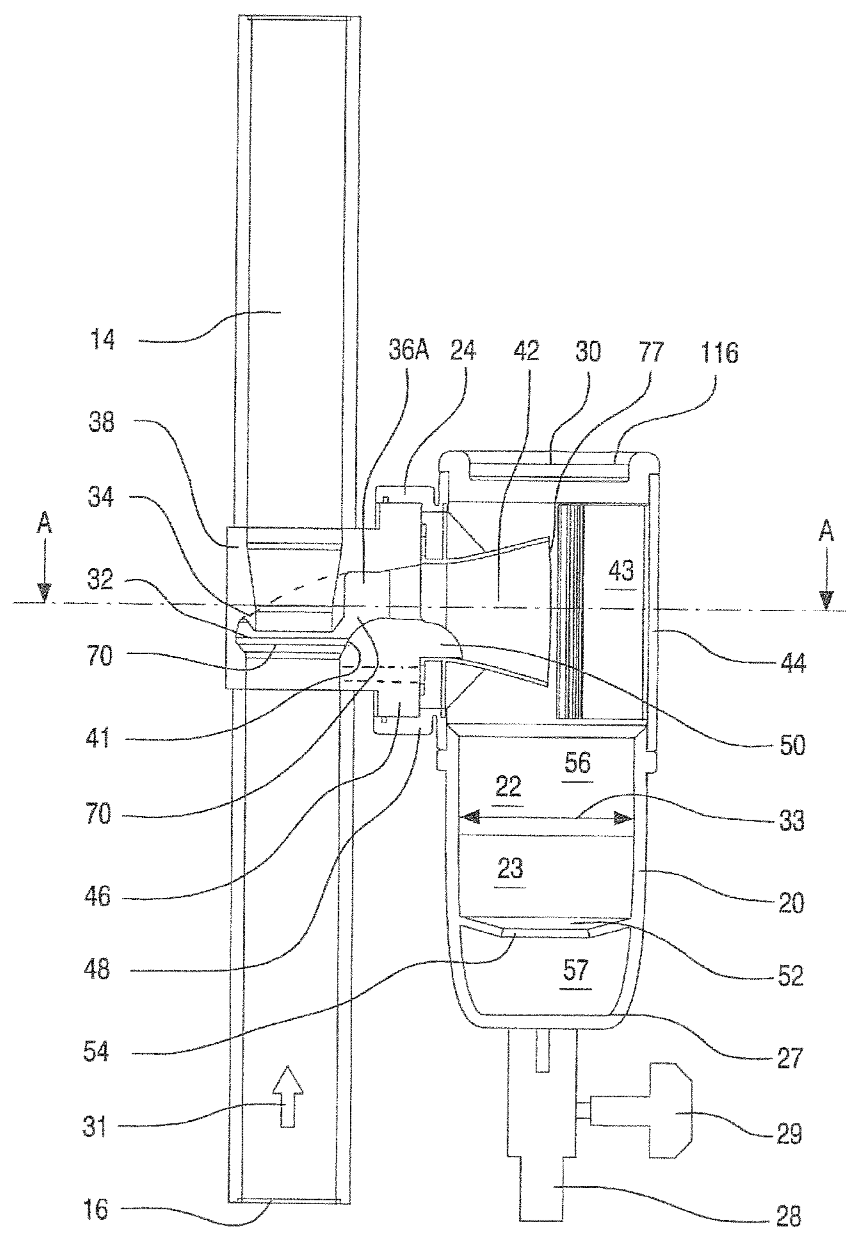
FIG. 2A shows a sectional side view of the removal device according to the invention, taken at the level of one of the supply channels.

Turning to FIG. 2A, the direction of the main flow is indicated with arrow 31. A local widening part 32 is provided in the main channel 14. The local widening part 32 is formed as a groove which extends substantially around the main channel. Directly downstream of the local widening part 32, a local narrowing part of the main flow channel 14 is provided. The local narrowing part is a sharp edge 34 which is directed against the direction of flow. The edge 34 also extends substantially around the main channel. The local widening part provides access to a supply channel 36A which extends from the main channel 14 to the inner space 22. As will be shown herein below, there are two supply channels 36A, 36B. The local widening part 32 gradually goes over in the supply channel 36A, 36B.

The local widening part 32, the edge 34 and the supply channels 36A, 36B are formed in a piece 38. The piece 38 is connected to the pipe 14. The supply channels 36A, 36B widen within the piece 38 and make a curve 40. From the curve 40, the supply channels 36A, 36B extend away from the main channel 14, substantially at a right angle to the main channel 14.

The branch-off location 70 may also be formed as a sharp C-shaped ridge 34 without a widening part 32. In this case, the ridge 34 projects into the main channel and the inner wall of the main channel upstream of the branch-off location 70 goes over in the supply channels 36A, 36B without any widening. This results in relatively narrow supply channels 36A, 36B.

Turning to FIG. 2A, the housing 20 is connected to the piece 38 at coupling 24.

Here, the piece 38 comprises a flange 46 with a circular shape. The housing has a circular mating section 48 which mates with the flange 46 and is rotatably connected to the flange 46. The mating section 48 and the flange 46 form the pivoting coupling 24.

The supply channel 36A gradually widens as a trumpet shape 42. At the end 77 of the trumpet shape 42, the supply channel 36 ends and opens into the inner space 22. This is where the quite zone is defined. In the inner space 22, plates 43 are provided which are connected to a wall 44 of the housing. As will be discussed further below, the plates act as energy dissipating devices.

The supply channel 36A extends from the piece 38 into the trumpet shape 42, which is part of the housing 20 and rotatably connected to the piece 38. A tongue 50 is formed in the piece 38 and provides a smooth transition from the piece 38 to the trumpet shape 42.

In use, the inner space 22 extends vertically, in order to allow dirt to settle and/or gas bubbles to rise. The coupling 24 allows the inner space to extend vertically, both for a vertical main channel 14 and in a horizontal main channel 14.

The inner space 22 has a diameter 33 which is greater than a diameter 83 of the main channel 14.

A separating device 52 in the form of a plate is provided in a lower region of the inner space 22. The separating device has a central hole 54. The separating device divides the inner space in an upper part 56 and a lower part 57. The upper part 56 can be divided in a lower region 101, also indicated as an end region 101 and an upper region 102, also indicated as an entry region 102.

Figure 2B:
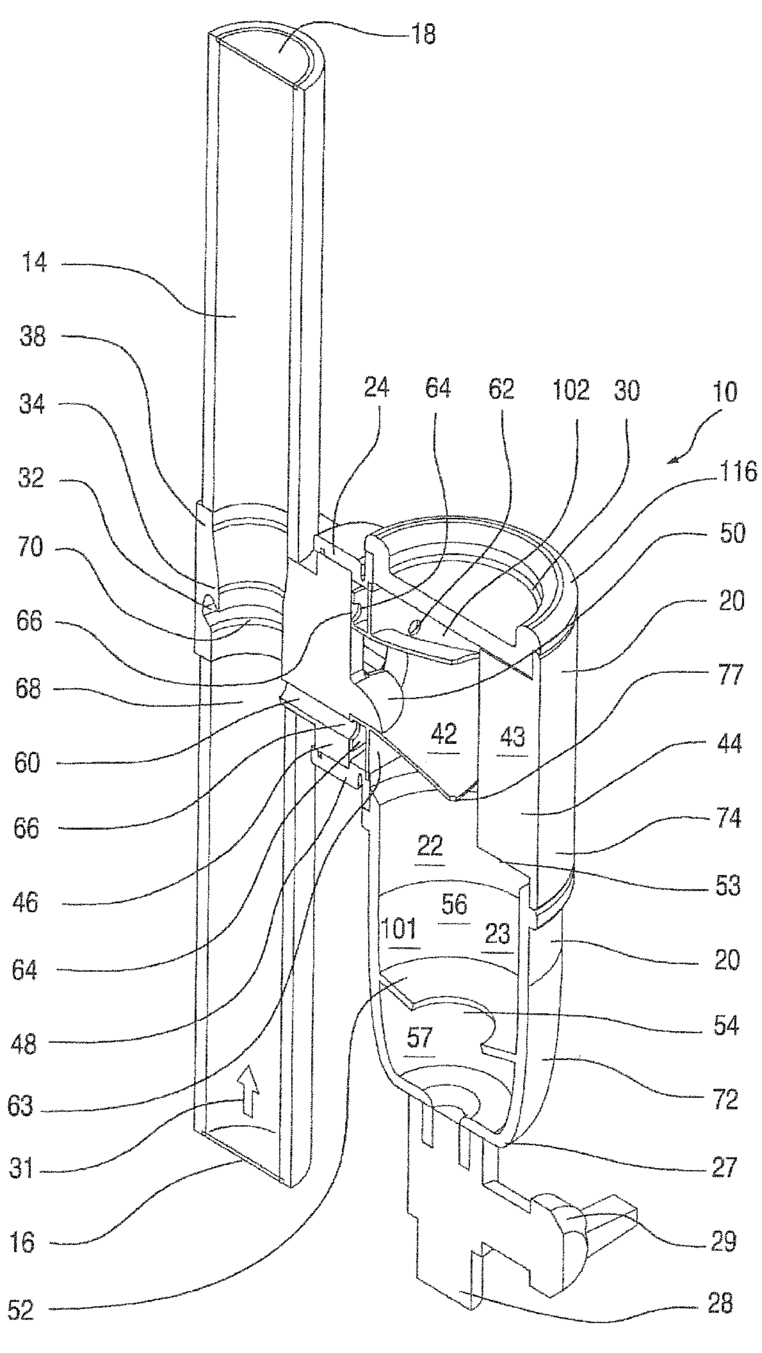
FIG. 2B shows an isometric sectional view of the removal device according to the invention, taken at the level of the return channel.

Turning to FIG. 2B, more details on the return channel 60 are shown. In the housing 20 return holes 62 are provided in a wall 63 which return holes provide access for a return flow into a return chamber 64. The return chamber 64 is formed between a wall 63 and a wall 65 of the housing 20.

Four holes 66 are formed in the wall 65. One hole 66 provides access to the return channel 60 from the return chamber 64. The holes are placed at equal distance from the pivot axis 26. The other holes 66 are idle and can be pivoted before the return channel as will be explained later.

The return channel 60 extends at a substantially right angle to the main channel from the return chamber 64 to the main channel 14. The return channel connects the inner space 22 with the main channel, indirectly via the return chamber 64. The return channel opens into the main channel at a merge location 68 which is located upstream from a branch-off location 70.

The housing 20 comprises a lower part 72 and an upper part 74. The plates 43 are formed in the upper part 74.

Figure 3:
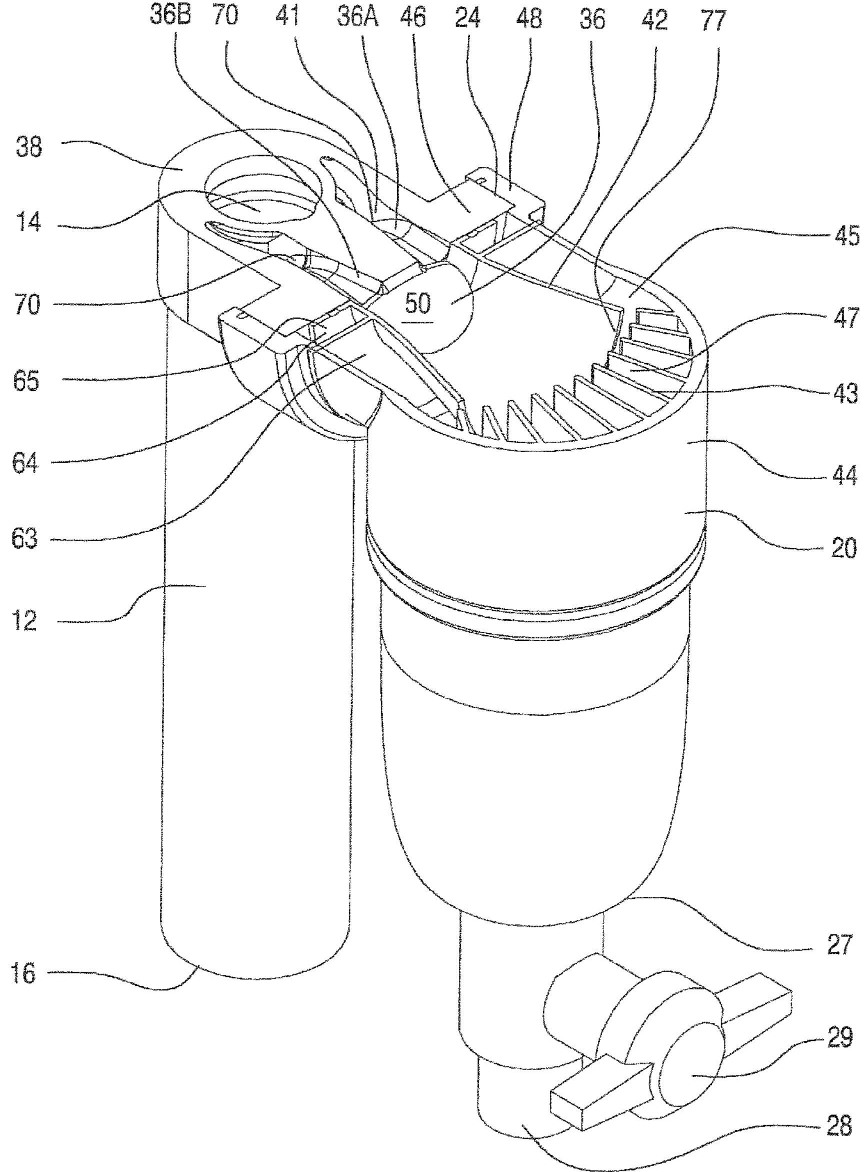
FIG. 3 shows an isometric sectional view taken along the lines A-A in FIG. 2A.

Turning to FIG. 3, the trumpet shape 42 is shown which is defined by a wall. The trumpet shape 42 ends just before the plates 43. The plates 43 project from the wall 44 of the housing 20 which opposes the trumpet shape. The plates 43 are oriented substantially radially against the direction of flow of the incoming supply channel 36. A small gap 45 is formed between the trumpet shape 42 and the plates 43. Between the plates 43, interspaces 47 are formed. The interspaces have a dead end 81 at the wall 44 and an open bottom at the lower ends 53 of the plates 43.

The two supply channels 36A, 36B which are formed in the piece 38 are also visible. The two supply channels 36A, 36B each have a part which extends over a distance in the direction of flow of the main channel 14 en curves to a more horizontal orientation. The two supply channels merge into a single supply channel 36 at the tongue element 50.

The walls 63, 65 which define the return chamber 64 extend parallel to one another and form an annular return chamber 64 which extends around the supply channel 36.

Figure 4:
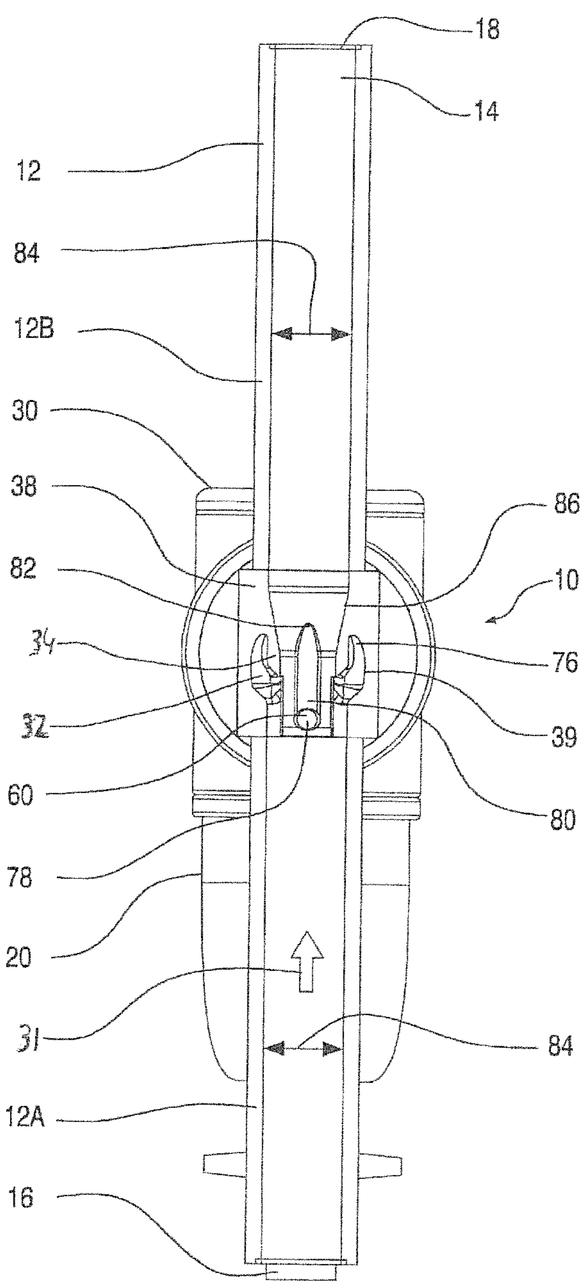
FIG. 4 shows a sectional side view taken at approximately the center of the main channel.
Figure 5:
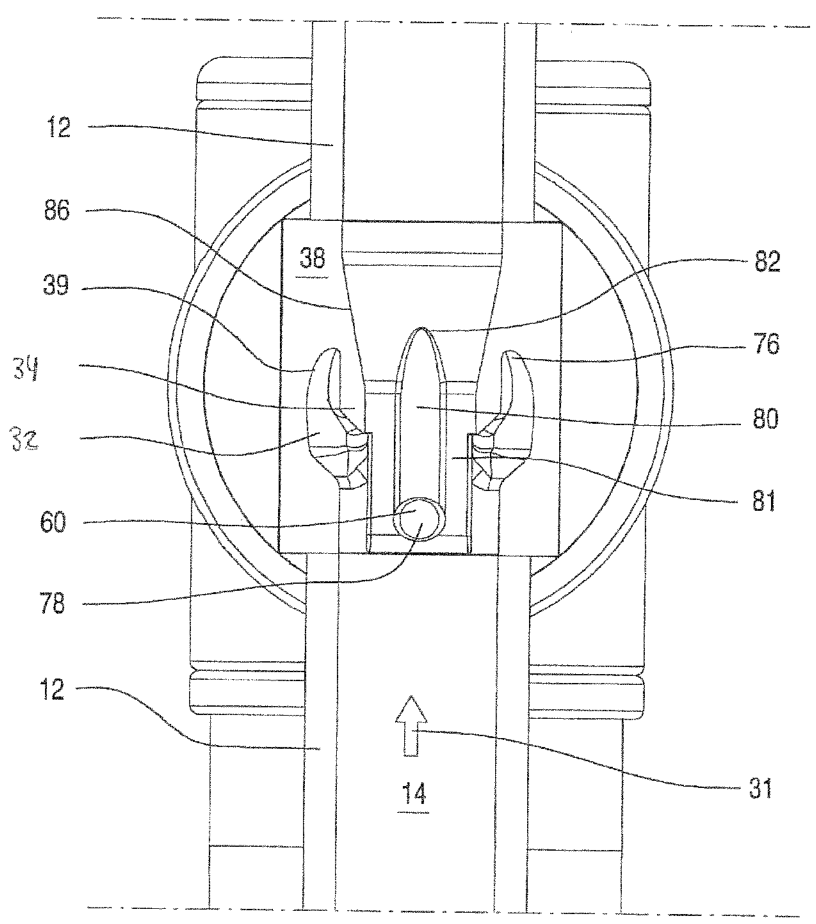
FIG. 5 shows a further detail of FIG. 4.
Figure 6:
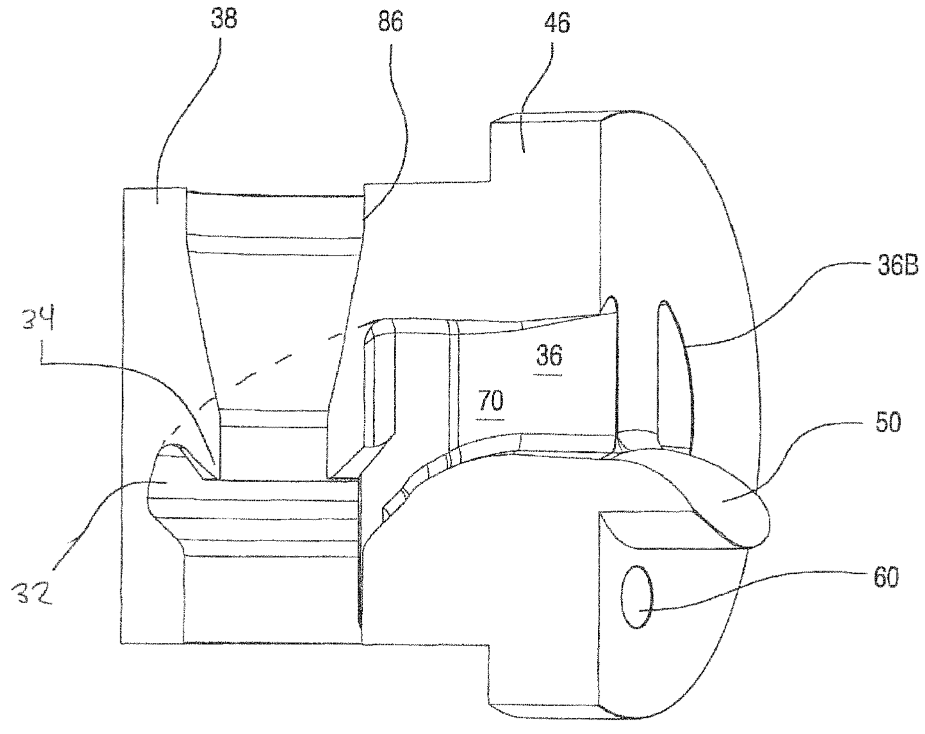
FIG. 6 shows a detail of the widening section in a sectional side view.

Turning to FIGS. 4, 5 and 6, the widening section 32 is formed as a cavity in the piece 38 and is defined by wall 39. The piece 38 is mounted between an upstream pipe 12A and a downstream pipe 12B. The widening section 32 extends circumferentially around the main flow channel, over an angle of at least 180 degrees, and may extend at least over 270 degrees.

The widening section 32 comprises a downstream end 76 which is rounded, when viewed in the direction 31 of flow of the main channel.

The return channel 60 has an opening 78 where it opens into the main channel 14. A groove 80 is formed downstream of the opening 78. The groove extends in the direction 31 of flow of the main channel 14 from the opening 78 to a position downstream of the widening section 32. The groove is formed in an elevated portion 81 of the piece 38. The wall 39 of the widening section gradually goes over in a wall 41 of the supply channels.

Downstream of the sharp edge 34 which forms a narrowing part of the main channel 14, the main channel 14 gradually widens in a tapering section 86 to its original diameter 84.

Figure 7:
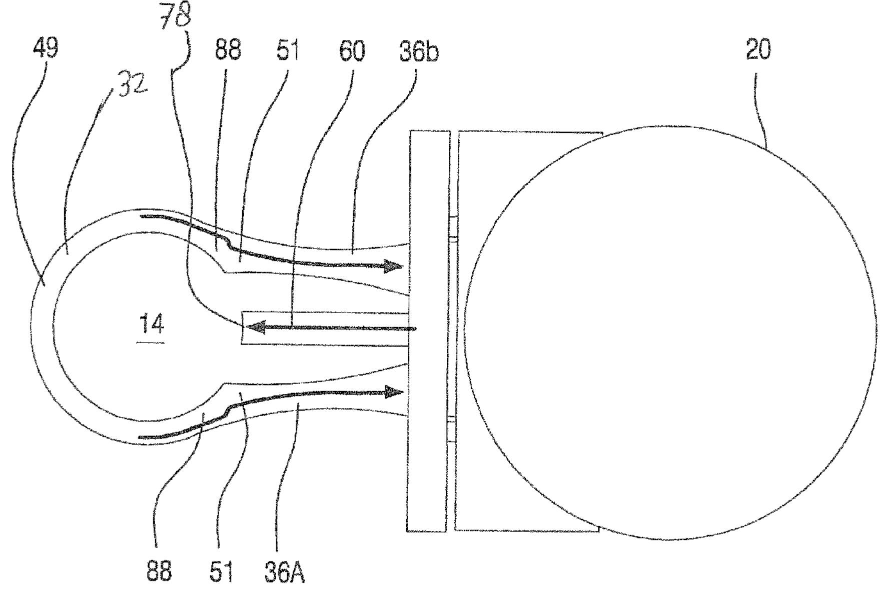
FIG. 7 shows a top view of the flow volumes defined by the piece.

Turning to FIG. 7, the widening section 32 is shown to form a C-shape 49 around the main channel 14. The supply channels 36A, 36B start at the ends 88 of the C-shape.

The return channel 60 is located between the supply channels 36A, 36B, when viewed in the direction 31 of the main flow, i.e. between the ends of the C.

Figure 10A:
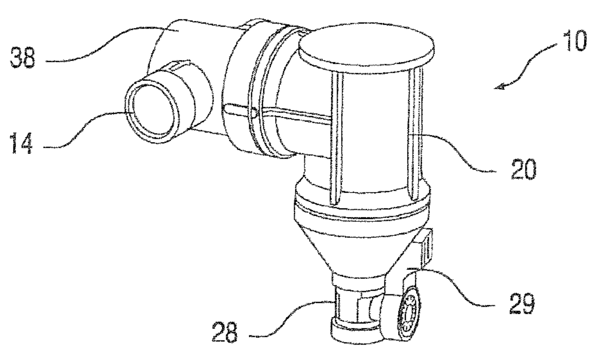
FIGS. 10A, 10B, 10C show different embodiments of the removal device according to the invention.
Figure 10B:
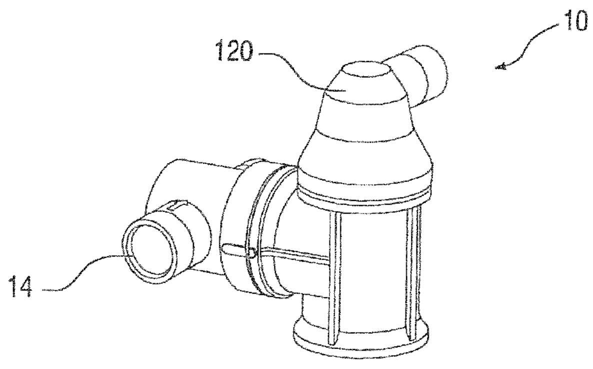
Figure 10C:
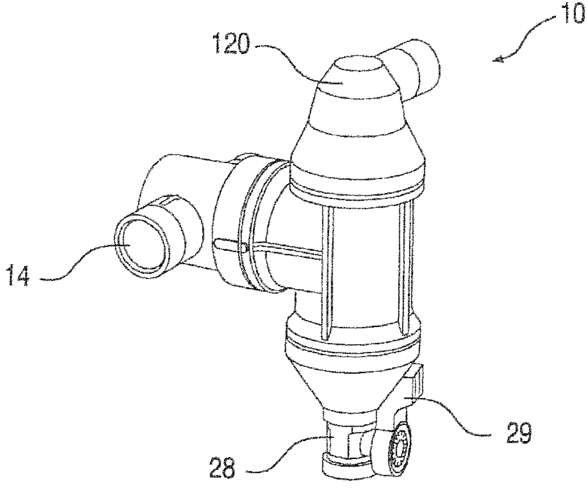

Turning to FIGS. 10A, 10B, 10C, different configurations of the removal device 10 are shown. FIG. 10A shows an embodiment with a dirt discharge 28, but not a gas discharge. FIG. 10B shows an embodiment without a dirt discharge 28, and with a gas discharge 120. The gas discharge may also be configured to remove a second, lighter liquid from a main, first liquid in the conduit system, while the dirt discharge may also be configured to remove a second, heavier liquid from the main. FIG. 10B shows an embodiment having both a dirt discharge 28, and a gas discharge 120.

Operation

Figure 8:
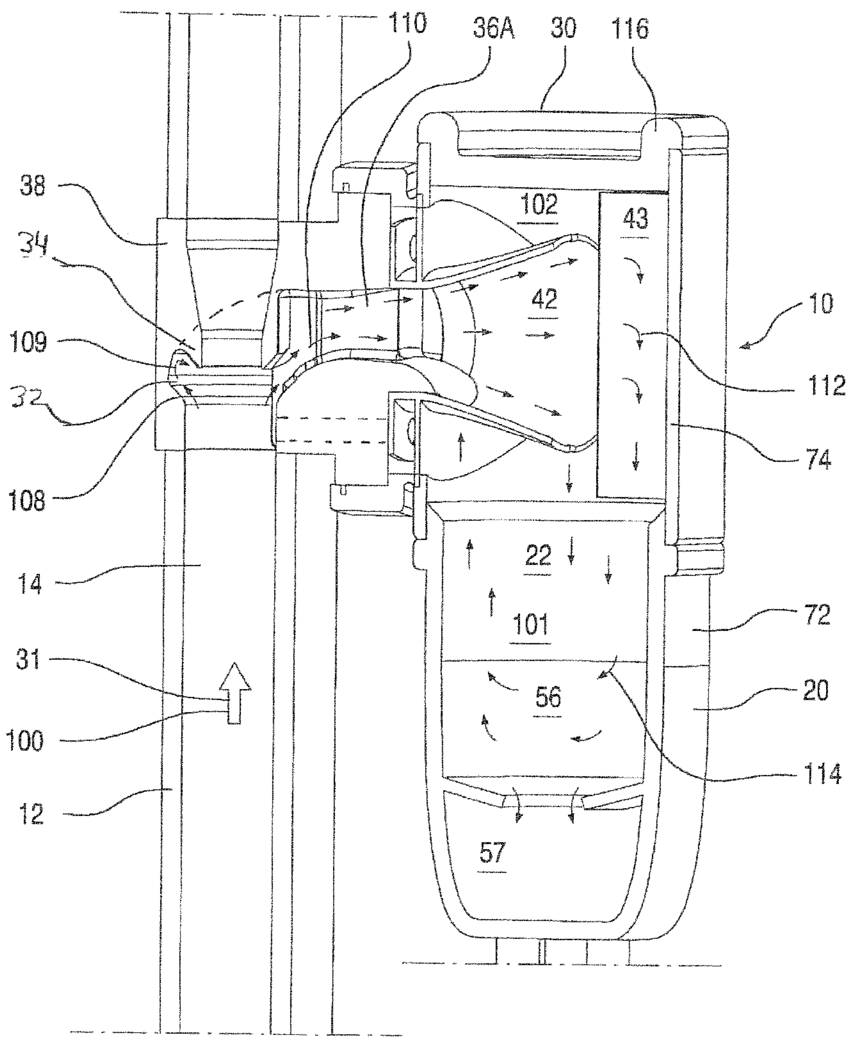
FIG. 8 shows a sectional side view of the removal device in use.
Figure 9:
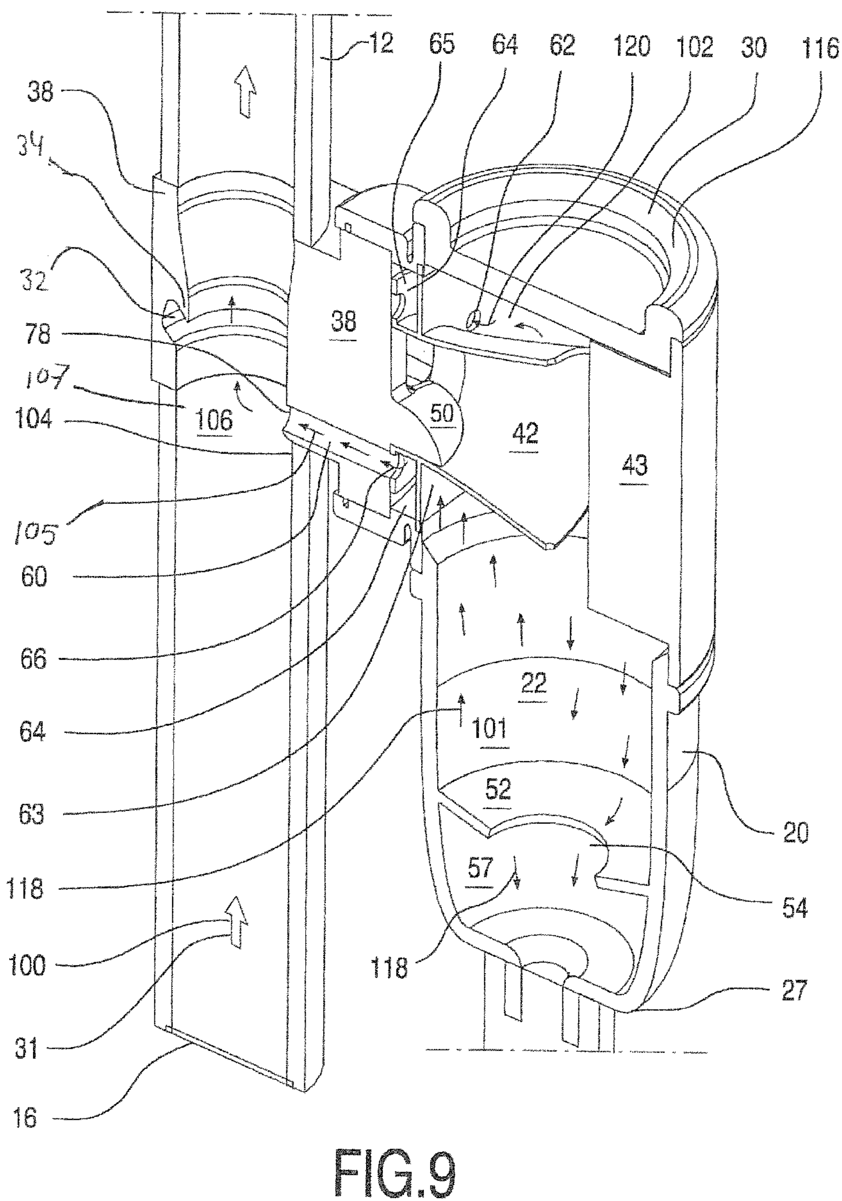
FIG. 9 shows an isometric sectional view of the removal device in use.

Turning to FIGS. 8 and 9, in use, the removal device 10 according to the invention is coupled to a conduit system. The housing 20 is oriented such that the dirt discharge 28 is at the bottom and a gas discharge (if present) is located at the top. To this end, the housing is pivoted relative to the pipe 12 via the coupling 24. If the pipe is vertical, the housing extends parallel to the pipe 12. If the pipe extends horizontally, the housing 20 extends at a right angle to the pipe 12. Depending on the orientation of the housing relative to the pipe 12 one of four holes 66 is located in front of the return channel 60. The other three holes 66 are idle and face a blind wall of the piece 38.

A main flow 100 of liquid, for instance water, flows through the entry 16 into the pipe 12. The flow reaches the opening 78 of the return channel 60. Here, the return flow 105 merges with the main flow 100. The return flow 105 projects from the side 104 of the main channel 14 substantially into a central region 106 of the main channel 14, pushing the main flow more or less to the outer region 107 of the main channel 14.

Next, the main flow 100 reaches the widening section 32. A part 108 of the main flow will enter the widening section 32, assisted by the sharp edge 34. The widening section 32 extends as a C-shape around the main channel and a flow 109 will occur through the C-shape, substantially around the main channel 14 and to the ends 88 of the C-shape. Two separate supply flows 110 (also indicated as branch flows 110) are therefore created.

In the widening section 32, a part of the kinetic energy of the main flow is converted into pressure energy, resulting in a pressure which is locally raised.

It is noted that although different numbers for the flow (e.g. 108, 109, 110) are used, these numbers may denote a same flow, but at different stages along the trajectory through the removal device.

The supply flows are created from substantially the outer portion of the main flow 100 which flows through the main channel 14. This is in particular helpful when the main channel 14 is oriented horizontally. In that case, the concentration of dirt particles will be relatively high near the bottom of the channel. The concentration of gas particles will be relatively high near the top of the main channel 14. By branching off the outer portion of the main flow 100, the bottom and top parts of the main flow are guided into the supply channel, and as a result the removal efficiency, is relatively high. The removal efficiency is defined as the percentage of dirt particles and gas bubbles in the main flow which are removed from the main flow as passes the removal device.

The supply flows 110 are directed into the supply channels 36A, 36B which start at the ends 88 of the C-shape. Next, the supply flows 110 curve horizontally away from the main flow 100 and merge into a single supply flow 110 (also indicated as branch flow 110). The supply flow subsequently flows through the widening section 42 and into the quiet zone 23. The velocity of the flow is reduced due to the widening of the cross-section area in the widening section in the trumpet shape, and a further widening in the quiet zone 23.

The at least one supply channel and the return channel are configured to branch off a supply flow 110 having a discharge which is between 1 and 8 percent of the discharge of the main flow 100. There are many ways of varying the ratio of the supply flow to the main flow. One way is to increase or decrease the diameter of the return flow channel 60. Another way is to vary the diameter of the supply channels 36A, 36B, or to vary the shape of the edge 32 or the shape of the widening part 32.

Next, the supply flow 110 encounters the energy dissipating devices 43 and enters the spaces 47 between the energy dissipating devices 43. The energy dissipating devices 43 cause friction and a further decrease of the velocity. The flow 112 inside the quiet zone 23 and between the plates 43 is directed downwards by the combination of the plates 43 and the end wall of the housing. Or upwards, in case of removing gas or combined dirt and air. Or both down-/upwards, in case of removing gas or combined dirt and air.

The flow of liquid travels further downwards at a very low velocity at 114. In the lower region 101 of the inner space 22, settling of dirt particles occurs and gas bubbles have the opportunity to rise. Dirt particles may travel through the opening 54 in the plate 52 and enter the lower part 57. From the lower part, the dirt particles may later be discharge via the discharge 28.

Gas bubbles may rise to the entry region 102. In an embodiment, a gas removal device is provided at the top for removal of the gas. In the shown embodiment of FIGS. 1-9, a cap 116 is provided instead of a gas removal device. If there are both a dirt removal device and a gas removal device, there are two end regions 101, i.e. one end region 101 at the dirt removal device and one end region 101 at the gas removal device. In this case, the entry region 102 is not the upper region, but located between the two end regions 101.

Next, the flow 118 travels back upward, still at a low velocity. The flow travels around the supply channel defined by the trumpet shape 42, and toward the return holes 62 which are provided in an upper region 102 of the inner space. The flow 120 travels through the holes 62 and into the return chamber 60. Next, the return flow flows downward, again around the supply channel 36 and toward the holes 66. The return flow subsequently travels through the return channel 60, through the hole 78 and back into the main channel 14.

Figures 11, 12:
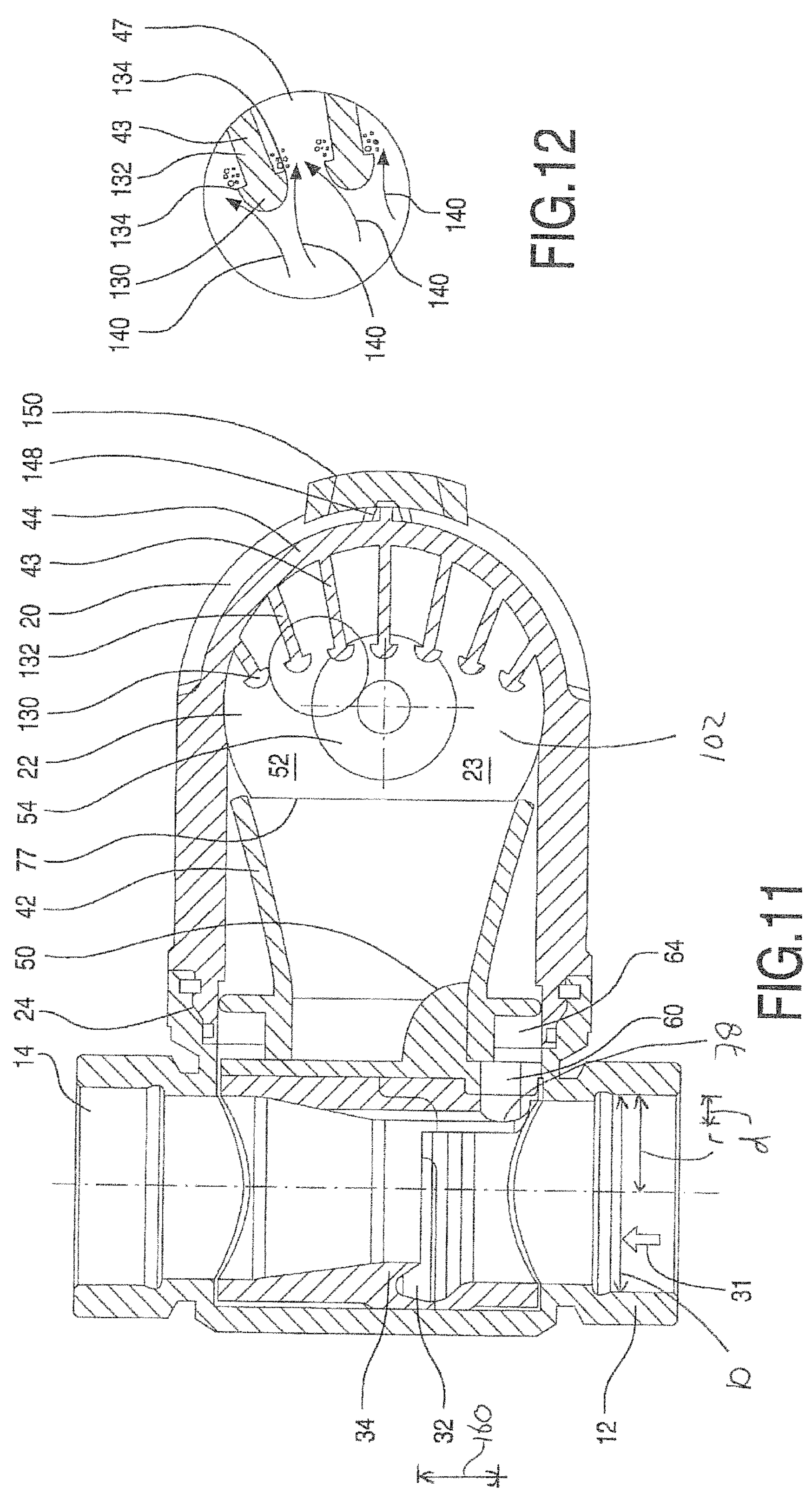
FIG. 11 shows a cross-section in top view of another embodiment.
FIG. 12 shows a detail in top view of a part of the embodiment of FIG. 11.

Turning to FIGS. 11 and 12, another embodiment is shown. The plates 43 comprise leading edges 130 which are thicker than a trailing portion 132 of each plate 43. The leading edge is curved and provides a streamlined guiding surface for guiding the flow. A sharp transition 134 is provided on either side of the plates 43 between the leading edges 130 and the trailing portion 132.

In use, the liquid will flow along the arrows 140 in the spaces between the plates 43. The leading edges 130 have a streamlined shape and guide the flow into the spaces 47. When the liquid flows past the sharp transition, an underpressure occurs. Due to Henry's law, the liquid can hold less gas in solution directly downstream of the transition 134. Therefore, gas bubbles will occur and rise to the upper region where the gas discharge is located.

Turning to FIG. 11, the arrangement of the return flow channel in relation to the main flow channel is shown. The return flow channel extends at an angle to the main flow channel which in this embodiment is 90 degrees, i.e. transverse to the main flow. The effect of this arrangement is that the return flow is injected into a central region of the main channel and forms a center portion of the main flow at the branch off location.

This effect can be achieved in a variety of ways. Driving factors are: the angle $\alpha$ at which the return channel extends to the main flow direction and the distance d over which the return channel protrudes into the main flow. If the return channel protrudes into the main channel over a greater distance, the return channel can make a smaller angel with the main flow direction. In particular, the relation between the angle $\alpha$ and the distance d is greater than 45-90*d/r and smaller than 135-90*d/r, wherein d is a distance over which the return flow channel protrudes into the main flow channel and r is a radius of the main flow channel. Within these boundaries, the return flow can form a center of the main flow at the branch-off location.

The velocity at which the return flow is injected into the main channel also plays a role. The velocity of the return flow at the return flow opening 78 will generally be at least 10 percent of the velocity of the main flow, more in particular between 10 and 50 percent of the velocity of the main flow. In particular when the angle $\alpha$ is large, i.e. 80-90 percent, the velocity needs to be large enough to inject the return flow into the central region of the main flow.

The distance 160 between the merge location 68 and the branch-off location 70 when measured along the main flow channel preferably is less than three times the diameter of the main flow channel. The distance 160 may be less than twice the diameter D of the main flow channel. In this way, mixing of the re-entered return flow and the main flow is substantially prevented, at least at the branch-off location. The skilled person will understand that further downstream, substantially complete mixing will occur.

The return flow channel may protrude into the main channel over a distance d which is at least 10 percent of a diameter of the main channel, in particular at least 15 percent of a diameter of the main channel.

Figure 15:
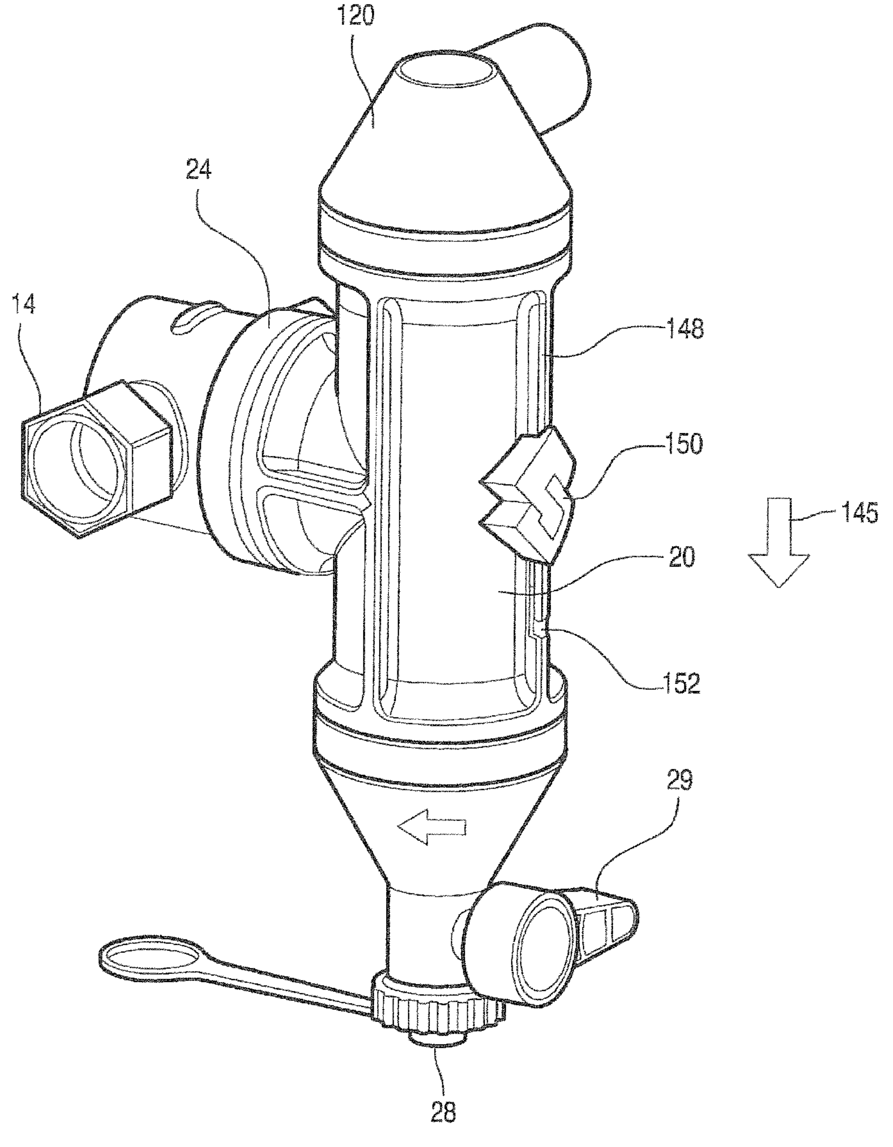

Turning to FIGS. 11 and 15, a rail 148 is provided on the outside of the housing 120. The rail 148 extends in the longitudinal direction of the inner space 22. The rail 148 extends from the area of the plates 43 downward, to the level of the lower region 101. A magnet 150 is provided on the rail 148, and is slideably arranged on said rail. The magnet can be moved from a first position near the plates 43 to a second position near the lower region 101. At the second, lower position, the magnet can be removed from the rail. At a lower position, an opening 152 is provided in the rail 148 which allows the magnet to be removed from the rail 148.

In use, when the magnet 150 is moved along this trajectory, in the direction of arrow 154 indicated in FIG. 15, the magnet takes along with it magnetite particles to the lower region 101, due to the magnetic force exerted by the magnet. When the magnet 150 is removed from the rail at the opening 152, the distance between the magnet 150 and the magnetite particles becomes so great that the magnetite particles are no longer attracted by the magnet. The magnetite particles subsequently settle on the bottom 27. Subsequently, the discharge 29 is opened to discharge the magnetite particles.

Figure 13:
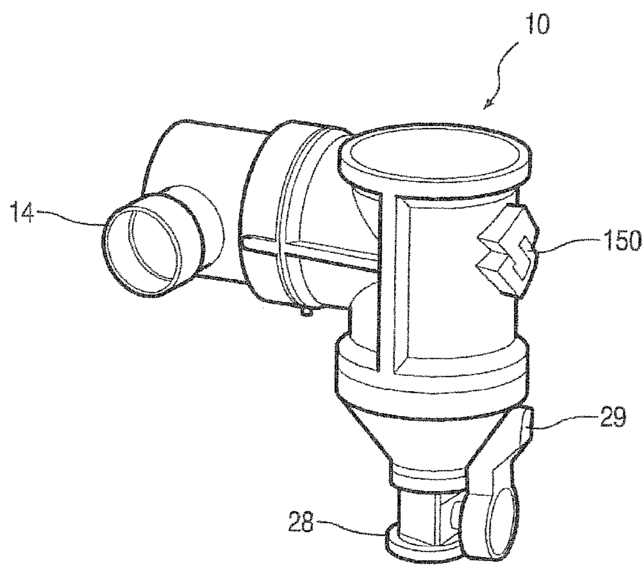
FIGS. 13, 14 and 15 show isometric views from the outside of the embodiment of FIG. 11.
Figure 14:
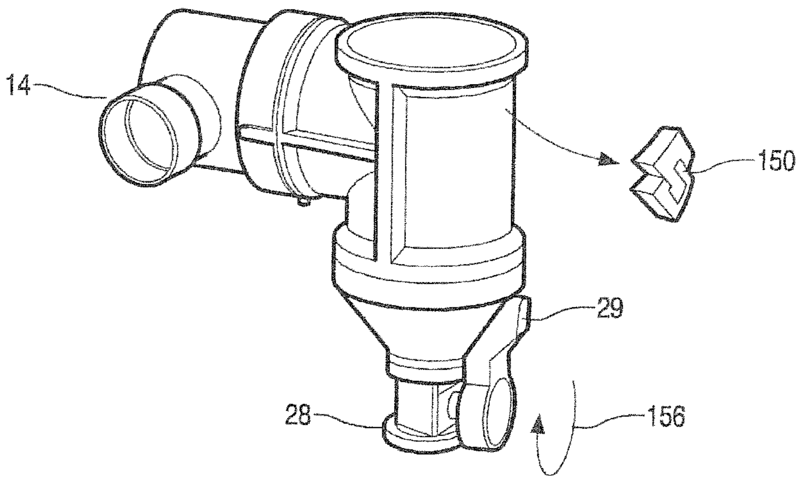

FIGS. 13, 14 and 15 show various embodiments of the device 10 according to the invention with the sliding magnet 150. In FIG. 14, it is shown that the magnet 150 is removed from the housing 20, and that the dirt discharge 28 is opened by rotating the mechanism 29 in the direction of arrow 156.

In FIG. 15, the rail 148 is shown which extends along the housing 20. The opening 152 is located at a lower point on the rail 148 and marks the functional endpoint of the rail 148.

Figure 16:
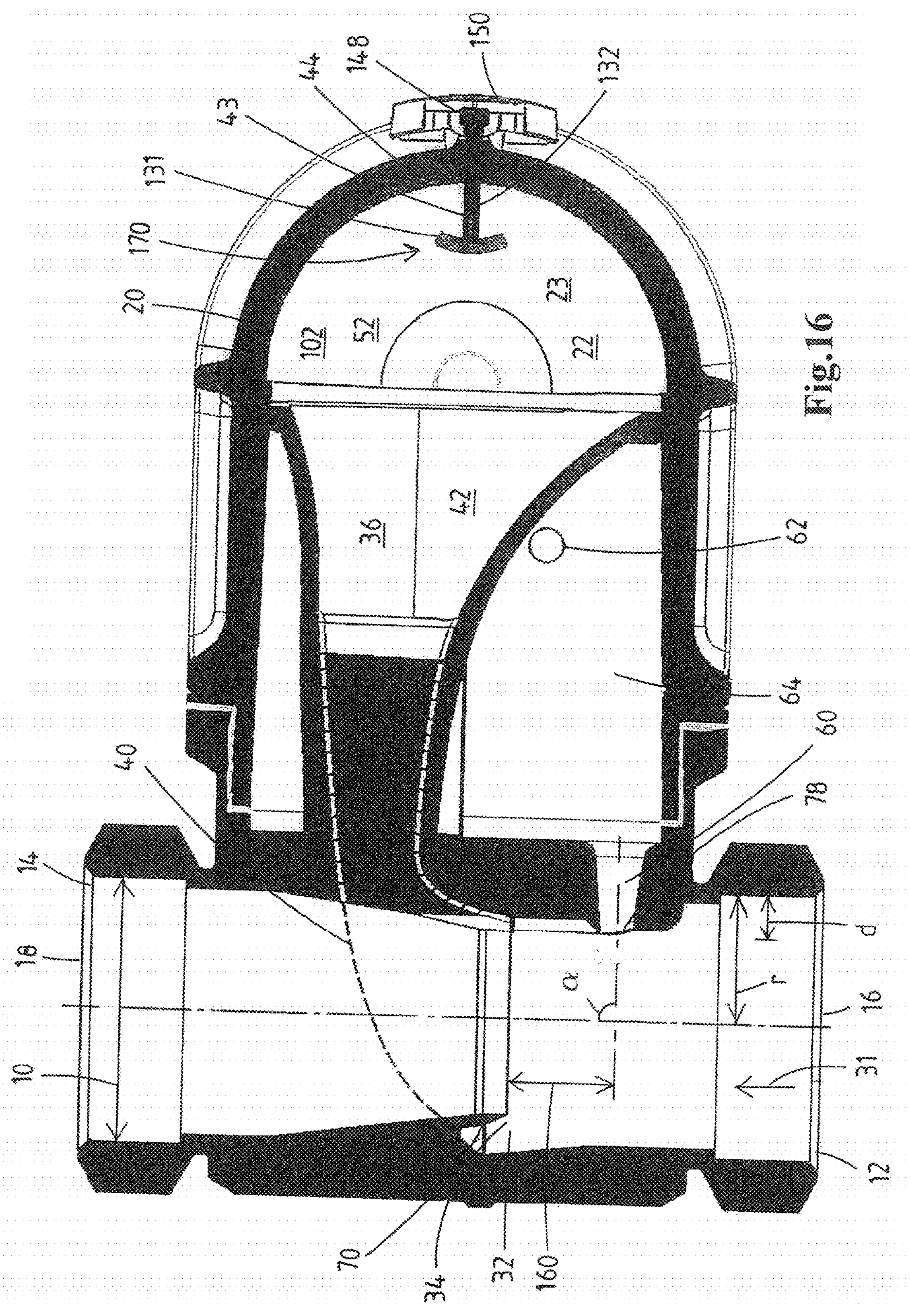
FIG. 16 shows a cross sectional view transverse to the direction of the main flow channel of another embodiment of the invention.
Figure 17:
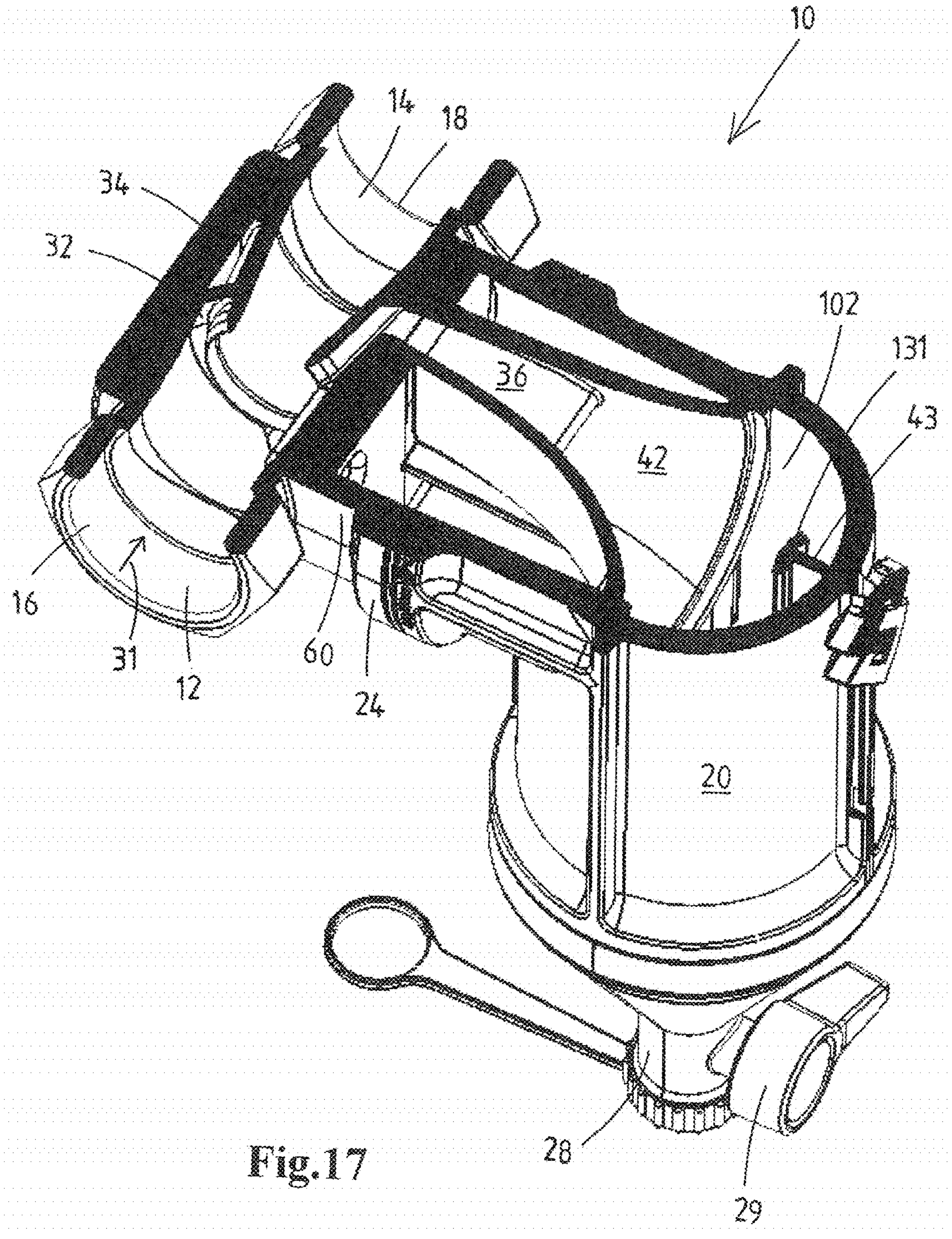
FIG. 17 shows a cross-sectional isometric view of the embodiment of FIG. 16.
Figure 18:
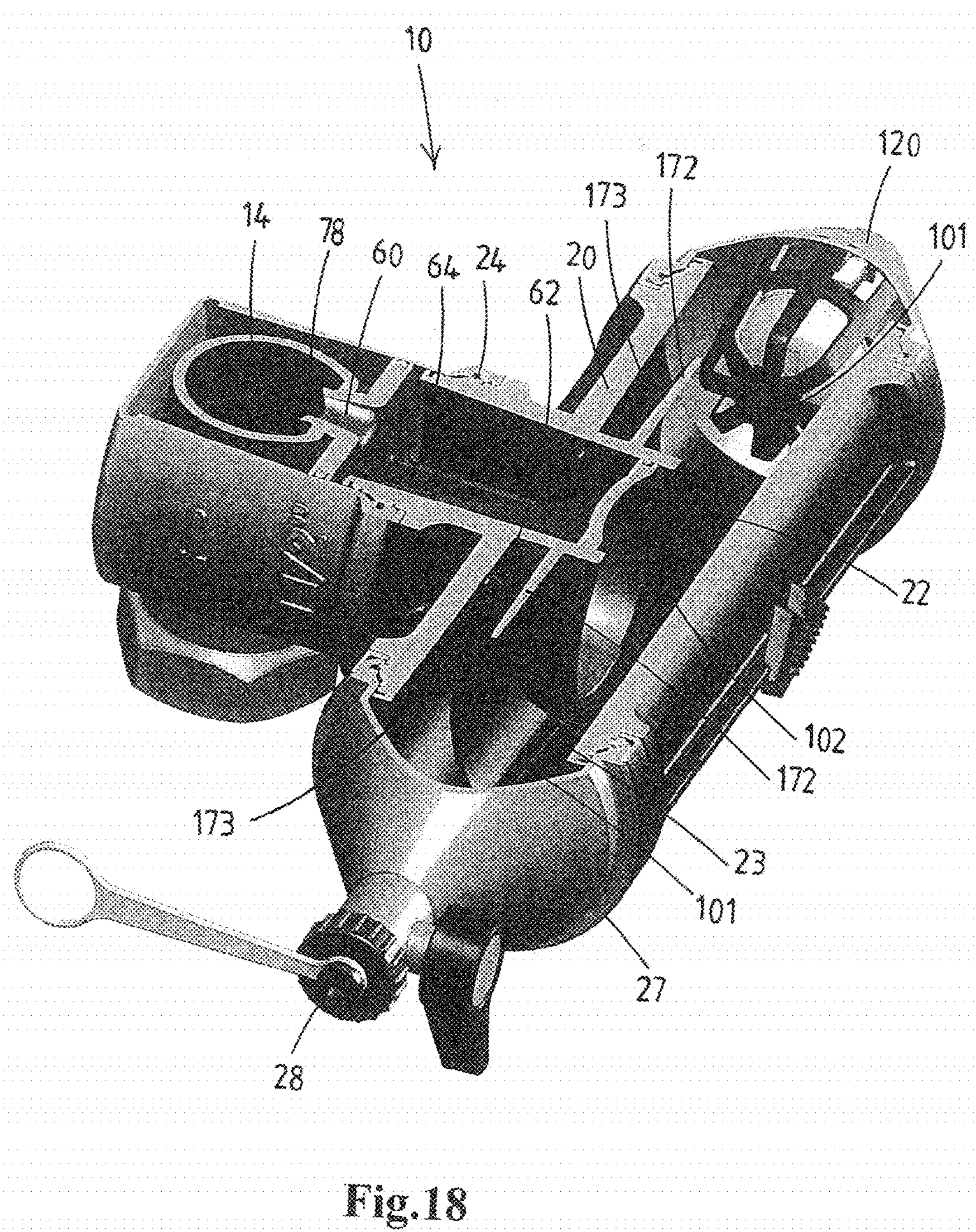
FIG. 18 shows a cross section of the embodiment of FIG. 16 according to a plane transverse to the main channel.

Turning to FIGS. 16, 17, 18 and 19, various views of another embodiment are shown. In FIG. 16, the supply channel 36 is indicated with dashed lines. In use, the branch flow curves 110 from the main flow into the quiet zone. The wall 44 of the housing acts as a flow guide and curves the branch flow further after entry into the quiet zone. At least a part of the branch flow is curved in a direction 170 substantially opposite to the flow direction 31 of the main flow by the combination of the supply channel 36 and the wall 44 of the housing.

The return chamber 64 is larger than in the embodiment of FIG. 11. An upper return opening 62 is formed as a channel, see FIG. 19.

The return channel 60 protrudes over a distance d into the main channel. The main channel has a radius r.

In order to inject the return flow into the central region of the main flow, an angle α at which the return flow enters the main flow channel is greater than 45-90*d/r and smaller than 135-90*d/r. d is a distance over which the return flow channel protrudes into the main flow channel and r is a radius of the main flow channel.

The distance 160 between the return flow opening 78 and the branch off location 70 measured along the main flow channel 14 is less than twice the diameter D (or four times the radius r) of the main flow channel, in particular less than the diameter D (or twice the radius) of the flow channel. In this way, mixing of the branch flow and the main flow occurs only downstream of the branch off location 70. At the branch off location, the return flow flows substantially in the center of the main channel, so that the return flow is not branched off again, or only branched off again to a little extent.

Figure 20:
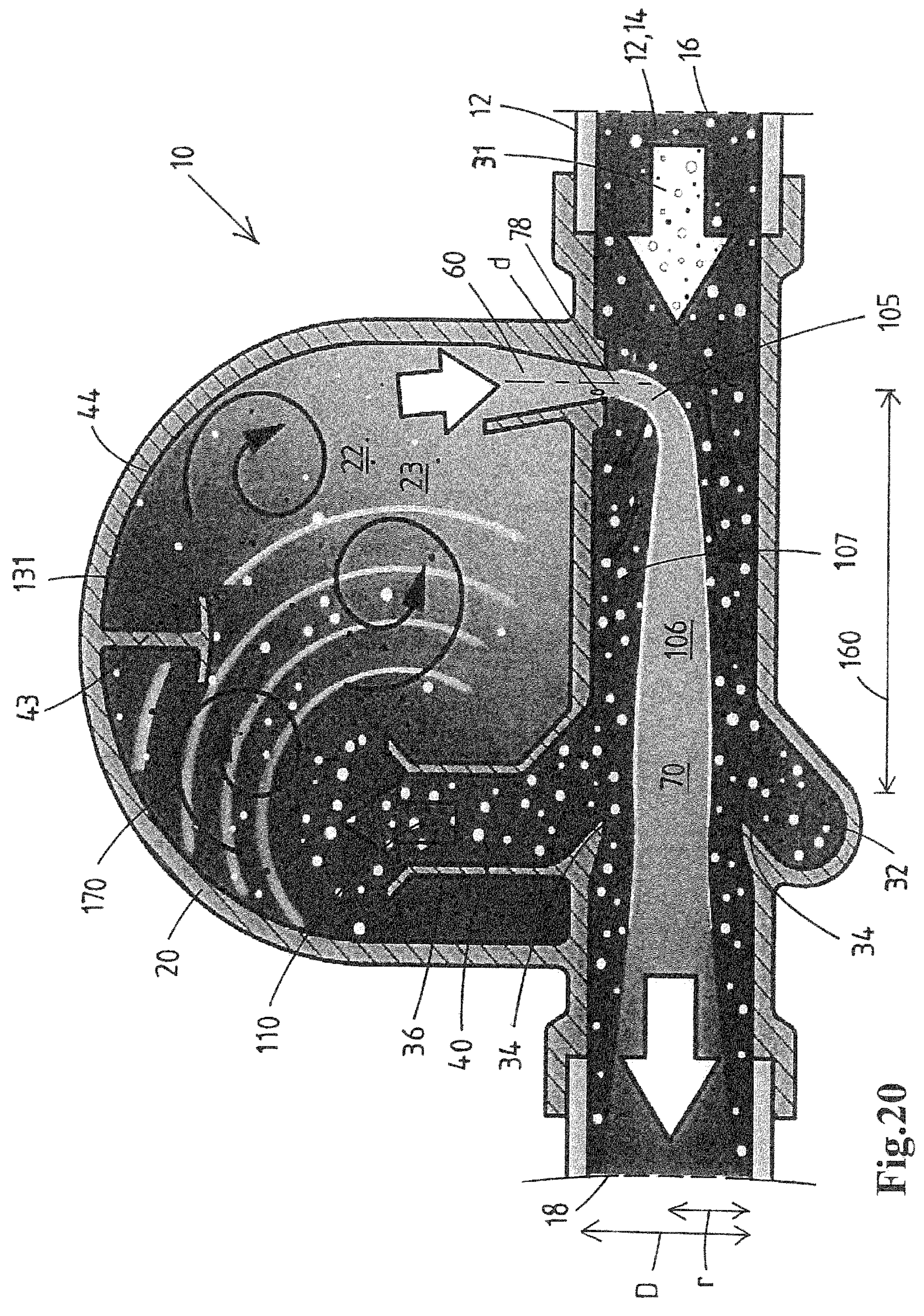
FIG. 20 shows a cross sectional view transverse to the direction of the main flow channel to clarify the operating principle of the invention.
Figure 21:
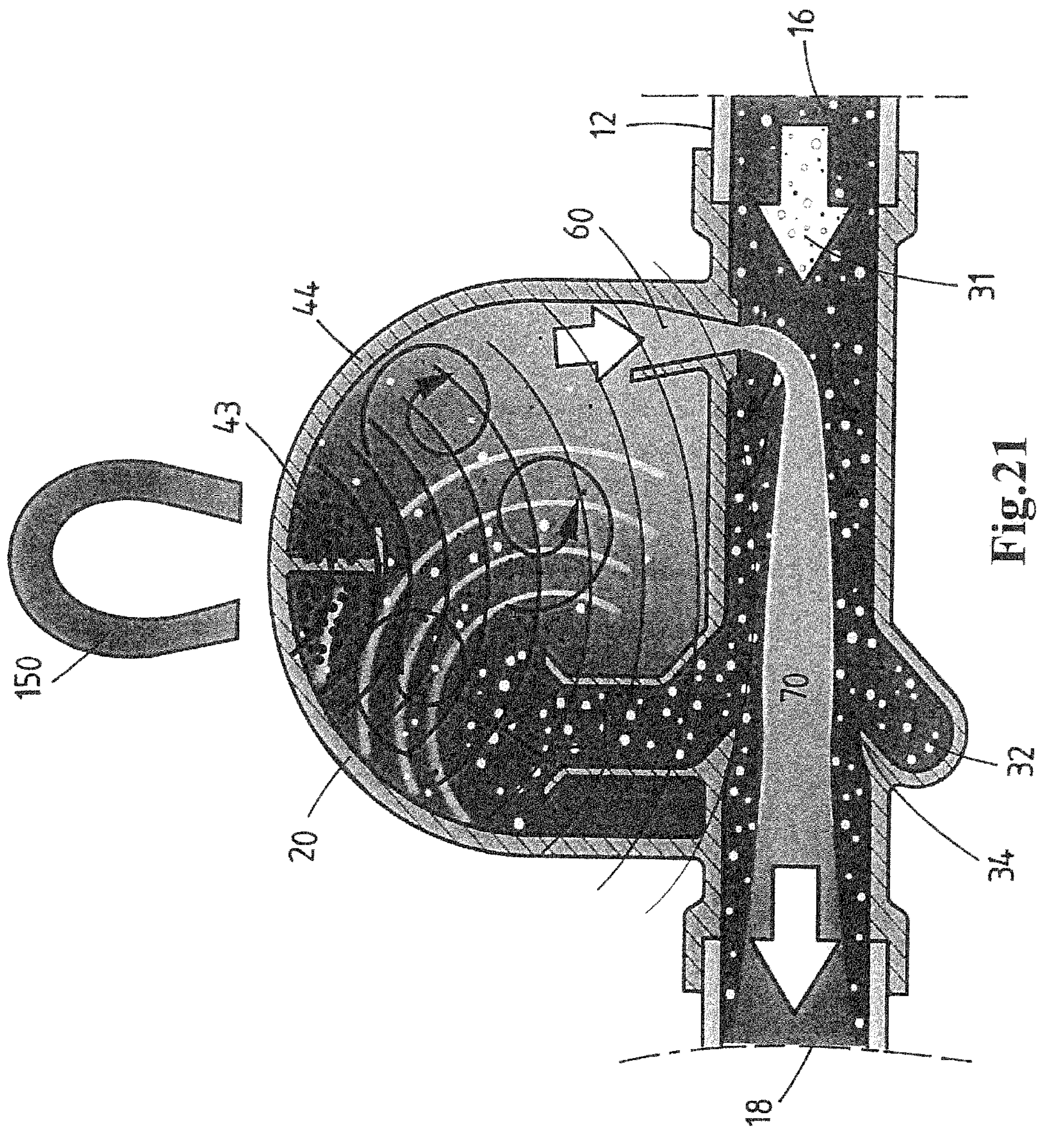
FIG. 21 shows a cross sectional view transverse to the direction of the main flow channel of again to clarify the operating principle of the invention.

Turning to FIGS. 20 and 21, the working of the invention is further explained. The return flow through the return channel 60 is made visible. The return flow is injected into the main channel and flows through a central region 106 of the main channel at the branch-off location 70. The main flow is pushed to the outer region 107 and into the widening section 32.

Downstream of the branch off location 70, the return flow mixes with the main flow. The return channel protrudes into the main channel over a distance d which is about 12 percent of the radius r of the main channel.

Since only a small portion of the main flow is branched off, the velocity in the supply channel 36 will be low relative to the velocity in the main channel. The supply channel 36 ends at an angle of about 90 degrees to the main flow channel. In use, the branch flow follows the outer side of the curve defined by the supply channel. The branch flow enters the inner space and is further guided along a curved trajectory by the wall 44 of the housing 20. Here, the velocity of the flow decreases further.

Subsequently, the flow encounters the protrusion 43, and is decelerated further. Dirt particles descend and gas bubbles ascend.

In the inner space 22, flow guides 172 in the form of plates are provided in order to increase the length of the flow path in the quiet zone 23, and thereby increase the residence time in the quiet zone 23.

An upper flow guide and a lower flow guide 172 are provided. The flow guides 172 extend upwardly and downwardly away from the trumpet shaped branch off channel 36 and are connected the wall of the housing at their left and right sides. The plates define a flow gap 173 between the plates and the inner wall of the housing. In use, the branch flow which flows through the inner space enters the inner space in the entry region 102 through the trumpet shaped section and is curved to the end regions 101. The incoming branch flow is forced to flow around the flow guides 172 on its way to the hole(s) 62.

Figure 19:
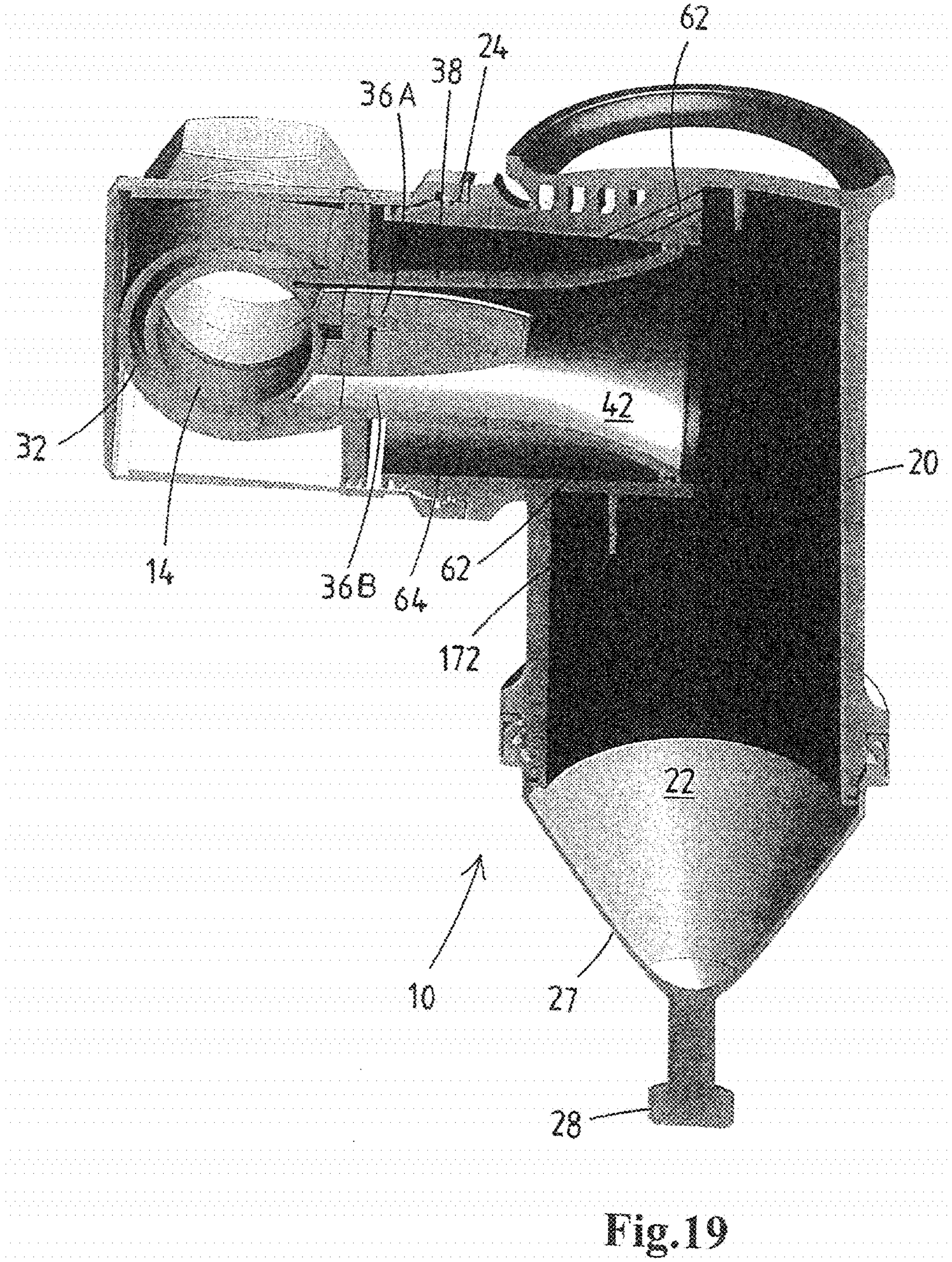
FIG. 19 shows a cross section of an embodiment similar to the embodiment of FIG. 16, but configured for dirt discharge only, according to a plane transverse to the main channel.

The embodiment of FIG. 19 is configured for dirt discharge only and therefore only has a flow guide 172 which extends downwardly. The embodiment of FIGS. 16-19 has a single energy absorption element 43.

Turning to FIG. 21, the effect of the magnet 150 is shown. Magnetite particles collect at the protrusion 43. When the magnet 150 is moved down along the rail, the magnetite particles are taken along in the direction of the dirt discharge 28.

Figures 22, 23:
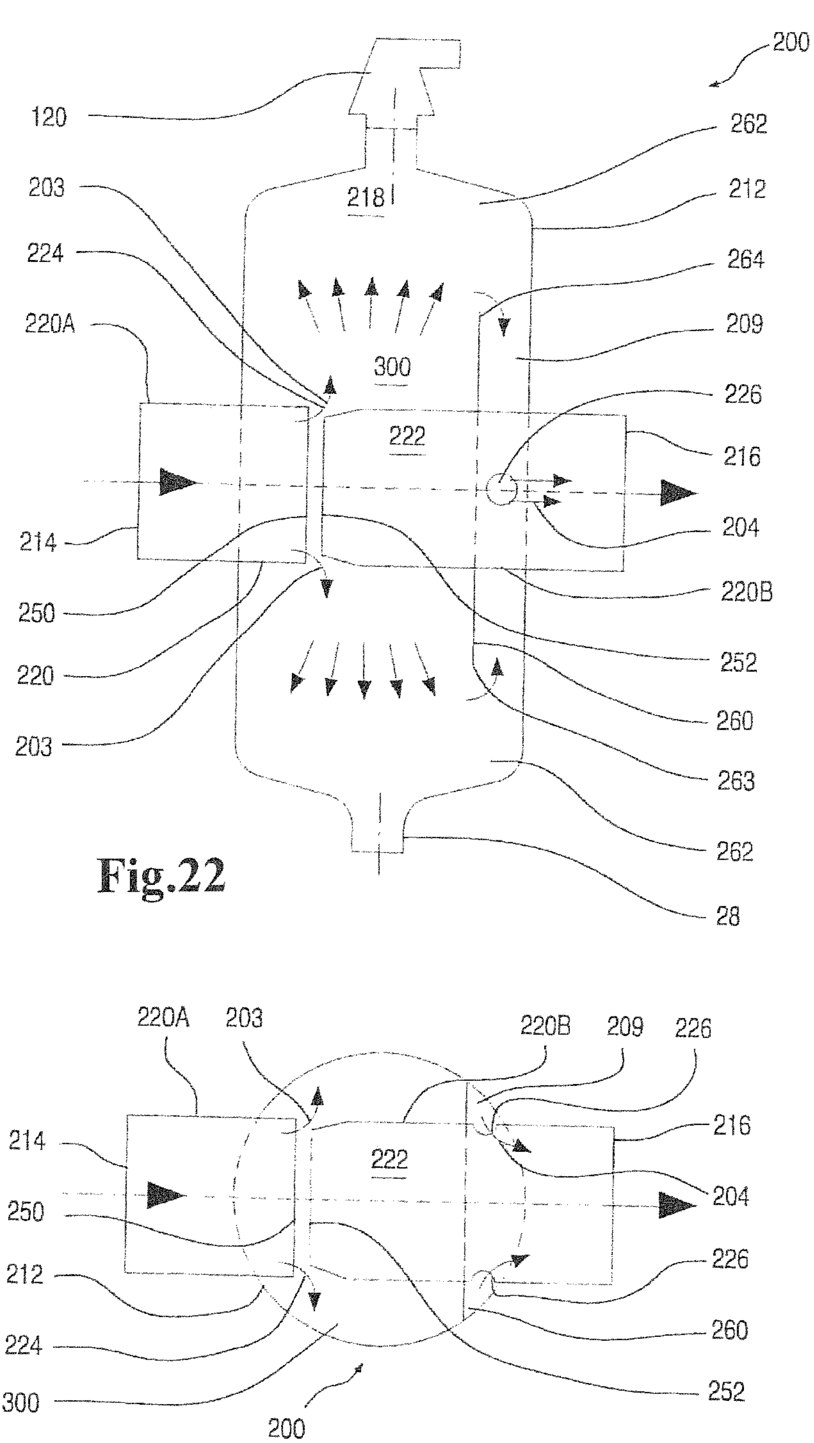
FIG. 22 shows a cross-section in top view of another removal device.
FIG. 23 shows a cross-section in side view of the removal device of FIG. 22.

FIGS. 22 and 23

Turning to FIGS. 22 and 23, another embodiment is shown of a removal device 210. The removal device 210 comprises a housing 212. The removal device has an entry 214, and an exit 216. The housing defines an inner space 218. A first tube 220A and a second tube 220B are positioned coaxially and define a main flow channel 222. The tubes 220A, 220B extend at least in part within the housing 212. The tubes 220A, 220B extend substantially between the entry 214 and the exit 216. The tube 220 substantially defines a main flow channel 222. At least one branch flow passage 224 is provided along the main flow channel 222. The branch flow passage 224 is between an end 250 of the first tube 220A and an end 252 of the second tube 220B. The branch flow passage 224 may also be provided as a series of holes in an ongoing tube 220 which is provided in the place of tubes 220A, 220B.

The end 252 of tube 220B has a smaller diameter than the end 250 of tube 220A, and is conical.

The branch flow passage 224 allows direct fluid communication between the main flow channel 222 and the inner space 218 in the housing outside the tubes 220A, 220B and within the inner space 218.

A quiet zone 300 is formed within the inner space 218.

A plate 260 is provided in a downstream region of the inner space 218, when viewed along the flow in the inner space and also when viewed along the main channel. The plate 260 extends vertically and leaves open sections 262 above the upper end 264 and below the lower end 263 of the plate. A single plate is provided.

Two return flow passages 226 are located at a downstream side of the housing 212, downstream of the plate 260. The return flow passages 226 allow fluid communication between the inner space 218 and the main channel 222, in particular between the area 209 and the main flow channel 222. The return flow passages 226 are dimensioned to create a branch flow which is relatively small in comparison with the main flow, for instance 1-15 percent of the main flow.

In use, at least one branch flow 203 originating from the at least one branch flow passage 224 enters the at least one quiet zone 300 and flows through the quiet zone 300. The liquid in the at least one quiet zone 300 has a substantially smaller velocity than the liquid in the main flow channel 222, due to the fact that only a relatively small portion of the main flow is branched off and due to the fact that the area of flow (or cross-sectional area) in the housing is much greater than the area of flow (or cross-sectional area) in the main channel 222. In the quiet zone, dirt particles may settle on the bottom of the housing and gas bubbles may rise to the top. A dirt discharge 28 is provided for discharging the dirt particles and possibly heavy contaminating liquids. A gas discharge 120 is provided for discharging gas bubbles and possibly contaminating lighter liquids.

The branch flow subsequently flows around the plate 264. From the at least one quiet zone 300, a return flow 204 flows through the at least one return flow passage 226.

This embodiment does not have the feature that the return flow which re-enters the main flow pushes the main flow to the sides, into the branch flow channel.

Figure 24:
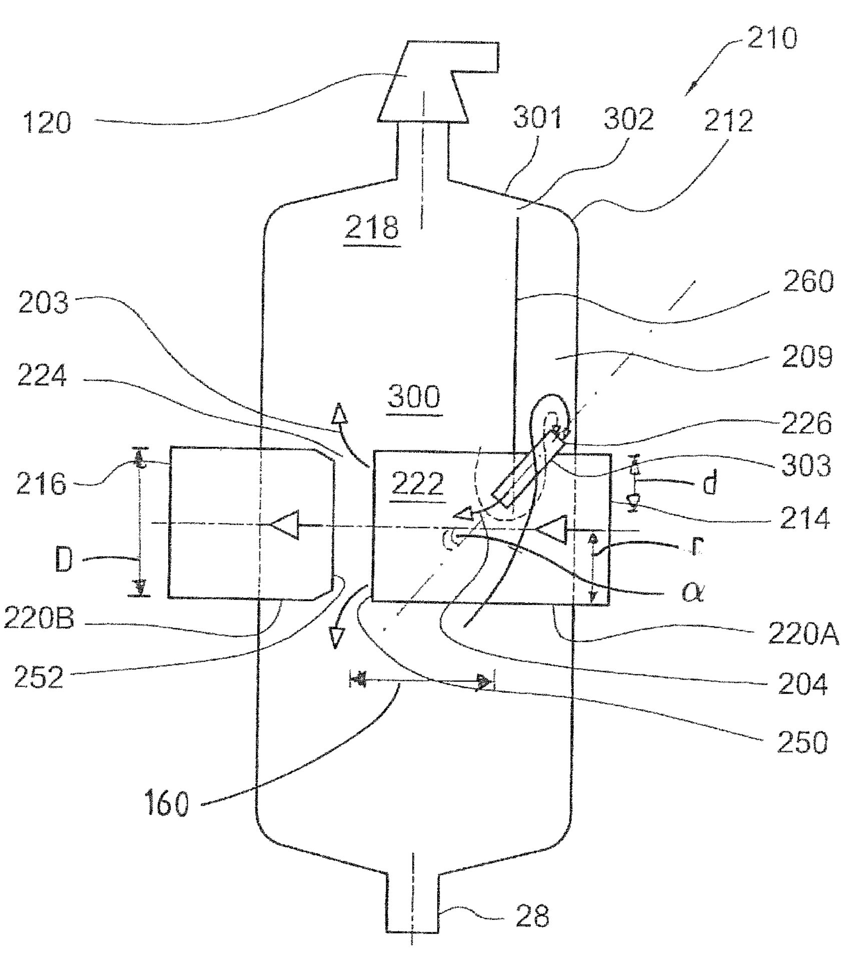
FIG. 24 shows a cross-section in top view of another removal device.
Figure 25:
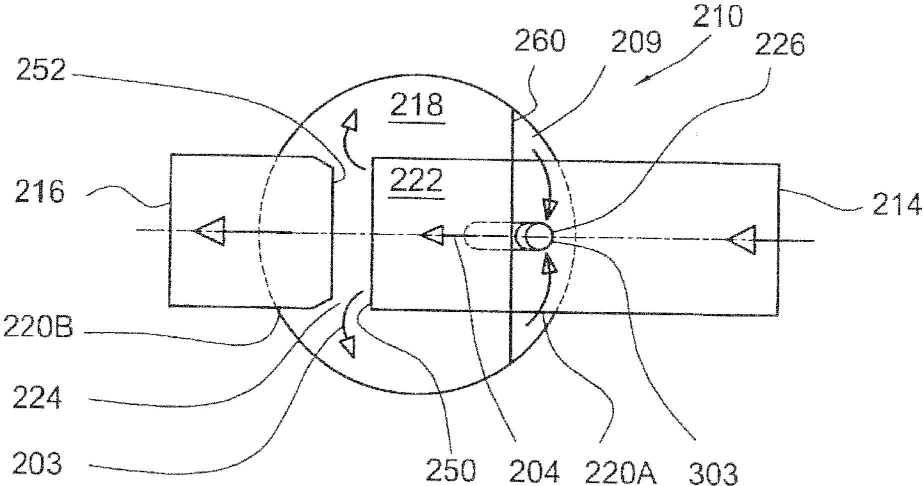
FIG. 25 shows a cross-section in side view of the removal device of FIG. 24.

FIGS. 24 and 25

Turning to FIGS. 24 and 25, another embodiment is shown of a removal device 210. The removal device 210 comprises a housing 212 formed by a housing wall 301. The removal device has an entry 214, and an exit 216. The housing 212 defines an inner space 218. A first tube 220A and a second tube 220B are positioned coaxially and define a main flow channel 222. The tubes 220A, 220B extend at least in part within the housing 212. The tubes 220A, 220B extend substantially between the entry 214 and the exit 216. The tube 220 substantially defines a main flow channel 222. At least one branch flow passage 224 is provided along the main flow channel 222. The branch flow passage 224 is between an end 250 of the first tube 220A and an end 252 of the second tube 220B. The branch flow passage 224 may also be provided as a series of holes in an ongoing tube 220 which is provided in the place of tubes 220A, 220B.

The end 252 of tube 220B has a smaller diameter than the end 250 of tube 220A, and is conical.

The branch flow passage 224 allows direct fluid communication between the main flow channel 222 and the inner space 218 in the housing outside the tubes 220A, 220B and within the inner space 218.

A quiet zone 300 is formed within the inner space 218.

A plate 260 is provided in an upstream region of the inner space 218, when viewed along the main channel. The plate 260 extends from the first tube 220A vertically in an upward direction. The plate 260 extends upwardly until it reaches the housing wall 301. At least one opening 302 is provided in the plate 260 in a position adjacent to or near the housing wall 301, which opening 302 facilitates the passage of air. The plate 260 may extend upwardly to a position adjacent to or near the housing wall 301, such that the opening 302 for allowing the passage of air is provided.

A return flow passage 226 is located at an upstream side of the housing 212, upstream of the plate 260, when viewed along the main channel. The return flow passage 226 allows fluid communication between the inner space 218 and the main channel 222, in particular between the area 209 and the main flow channel 222. The area 209 is formed by the space surrounded by the first tube 220A, the plate 260 and the housing wall 301. In the embodiment shown, there is one return flow passage 226 provided. It is possible that multiple return flow passage 226 are provided. The return flow passage(s) 226 are dimensioned to create a branch flow which is relatively small in comparison with the main flow, for instance 1-15 percent of the main flow.

In use, at least one branch flow 203 originating from the at least one branch flow passage 224 enters the at least one quiet zone 300 and flows through the quiet zone 300. The liquid in the at least one quiet zone 300 has a substantially smaller velocity than the liquid in the main flow channel 222, due to the fact that only a relatively small portion of the main flow is branched off and due to the fact that the area of flow (or cross-sectional area) in the housing is much greater than the area of flow (or cross-sectional area) in the main channel 222. In the quiet zone, dirt particles may settle on the bottom of the housing and gas bubbles may rise to the top. A dirt discharge 28 is provided for discharging the dirt particles and possibly heavy contaminating liquids. A gas discharge 120 is provided for discharging gas bubbles and possibly contaminating lighter liquids.

The branch flow subsequently flows under the plate 260 into the area 209. From the at least one quiet zone 300, a return flow 204 flows through the return flow passage 226 back into the main flow channel 222. The opening 302 does not provide any significant contribution to the flow of liquid into the area 209.

The return flow passage 226 is formed by a tube 303 extending from the area 209 into the main flow channel 222. The tube extends transverse to the main flow (when seen in the direction of the main flow channel) and in a down stream direction (when seen in side view).

The tube extends at an angle of about 45 degrees to the main flow when seen in side view and extends into the main flow channel over a distance d of about 0.6 times the radius of the main flow channel. In this way the branch flow is injected into a central region of the main channel and substantially forms the center of the main flow at the branch-off location. This substantially prevents the return flow from being branched off again at the branch-off location.

The same factors for the angle $\alpha$ and the distance d as discussed above apply for the embodiment of FIGS. 24 and 25, i.e. the further the return flow channel extends into the main flow channel, the more aligned the branch flow channel 60 is with the main flow channel 14.

In another embodiment, the return flow passage 226 may also be formed by an opening in the part of the first tube 220A located in the area 209.

It will be obvious to a person skilled in the art that the details and the arrangement of the parts may be varied over considerable range without departing from the scope of the claims.

I claim:

1. A removal device for removing gas bubbles and/or dirt particles from a liquid in a liquid conduit system or for removing particles of a heavier or lighter liquid from the liquid in the liquid conduit system, the removal device comprising:

an entry, at least one exit, a housing which defines an inner space, a main flow channel for a main flow, the main flow channel extending from the entry to the at least one exit at least in part through the inner space, the main flow channel being defined by a first tube and a second tube, at least one branch flow passage defined by an end of the first tube and an end of the second tube, the at least one branch flow passage allowing fluid communication between the main flow channel and a quiet zone outside the first and second tubes and within the inner space which is defined by the housing, and at least one return flow passage, the at least one return flow passage allowing fluid communication between the quiet zone outside the first and second tubes and the main flow channel, wherein the quiet zone has a greater cross-sectional area than the main flow channel and, wherein the removal device is constructed to branch off only a portion of the main flow, with the result that in use liquid in the quiet zone has a smaller velocity than liquid in the main flow channel, allowing dirt or particles of a heavier liquid to settle and/or allowing gas bubbles or particles of a lighter liquid to rise in the quiet zone.

2. The removal device of claim 1, wherein a plate is provided at a downstream end of the inner space and upstream of the at least one return flow passage, when viewed along the direction of flow in the inner space.

3. The removal device of claim 1, wherein the at least one branch flow passage provides direct access from the main flow channel to the quiet zone.

4. The removal device of claim 1, wherein a plate is provided at an upstream end of the inner space and downstream of the at least one return flow passage, when viewed along the direction of flow in the main channel.

5. The removal device of claim 4, wherein the plate extends from the second tube vertically in an upward direction until it reaches a housing wall of the housing.

6. The removal device of claim 4, wherein at least one opening is provided by the plate at a position adjacent to a housing wall, which opening is dimensioned to facilitate the passage of air.

7. The removal device of claim 1, wherein the at least one return flow passage is located at an upstream side of the housing, when viewed along the direction of flow in the flow main channel.

8. The removal device of claim 4, wherein the plate and the at least one return flow passage are constructed to in use force the liquid to flow underneath a lower edge of the plate to reach the at least one return flow passage.

9. The removal device of claim 4, wherein the at least one return flow passage is formed by a third tube extending from an area surrounded by the third tube, the plate and a housing wall into the main flow channel.

10. The removal device of claim 9, wherein, when viewed in the direction of the main flow channel, the third tube extends substantially transverse to the main flow channel and, when viewed in side view, the third tube extends in a downstream direction.

11. The removal device of claim 1, wherein the at least one return flow passage is configured to inject a return flow into a central region of the main flow channel.

12. The removal device of claim 1, wherein, apart from the end of the at least one return flow passage which may form a protrusion into the main channel, the main flow channel is free of any obstructions.

13. The removal device of claim 1, wherein, when seen in side view, an angle $\alpha$ at which the at least one return flow passage extends relative to the main flow channel is greater than (45 minus (90*d/r)) degrees and smaller than (135 minus (90*d/r)) degrees, wherein d is a distance over which the return flow passage protrudes into the main flow channel and r is a radius of the main flow channel.

14. The removal device of claim 1, wherein a distance between a merge location and a branch-off location measured along the main flow channel is less than three times the diameter of the main flow channel.

15. The removal device of claim 1, the return flow passage is configured to inject the return flow substantially into a central region of the main flow channel upstream of a branch off location.

16. A method of removing dirt particles or gas bubbles from a liquid, the method comprising:

providing a removal device according to claim 1, and guiding a flow of liquid through the removal device.

17. The removal device of claim 2, wherein the plate extends from the second tube vertically in an upward direction until it reaches a housing wall of the housing.

18. The removal device of claim 2, wherein at least one opening is provided by the plate at a position adjacent to a housing wall, which opening is dimensioned to facilitate the passage of air.

19. The removal device of claim 2, wherein the plate and the return flow passage are constructed to in use force the liquid to flow underneath the lower edge of the plate to reach the at least one return flow passage.

20. The removal device of claim 2, wherein the return flow passage is formed by a third tube extending from an area surrounded by the third tube, the plate and the housing wall into the main flow channel.

21. The removal device of claim 20, wherein, when viewed in the direction of the main flow channel, the third tube extends substantially transverse to the main flow channel and, when viewed in side view, the third tube extends in a downstream direction.

* * * * *